United States Patent
Rains, Jr. et al.

(10) Patent No.: US 9,719,012 B2
(45) Date of Patent: Aug. 1, 2017

(54) TUBULAR LIGHTING PRODUCTS USING SOLID STATE SOURCE AND SEMICONDUCTOR NANOPHOSPHOR, E.G. FOR FLORESCENT TUBE REPLACEMENT

(75) Inventors: Jack C. Rains, Jr., Herndon, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 515 days.

(21) Appl. No.: 12/729,788

(22) Filed: Mar. 23, 2010

(65) Prior Publication Data

US 2011/0175510 A1     Jul. 21, 2011

Related U.S. Application Data

(63) Continuation-in-part of application No. 12/697,596, filed on Feb. 1, 2010, now Pat. No. 8,212,469.

(51) Int. Cl.

| | |
|---|---|
| *F21K 9/27* | (2016.01) |
| *C09K 11/57* | (2006.01) |
| *C09K 11/58* | (2006.01) |
| *H05B 33/08* | (2006.01) |
| *F21K 9/64* | (2016.01) |

(Continued)

(52) U.S. Cl.
CPC .......... *C09K 11/574* (2013.01); *C09K 11/584* (2013.01); *F21K 9/27* (2016.08); *F21K 9/64* (2016.08); *H05B 33/0803* (2013.01); *F21Y 2101/00* (2013.01); *F21Y 2103/00* (2013.01);

(Continued)

(58) Field of Classification Search
CPC ....... C09K 11/574; C09K 11/584; F21K 9/27; F21K 9/64; F21Y 2103/00; F21Y 2115/10; F21Y 2101/00; F21Y 2103/10; H05B 33/0803; H05B 33/0857
USPC ....... 362/606, 607, 608, 609, 611, 612, 613, 362/615, 616, 617, 621, 629, 632, 633, 362/634

See application file for complete search history.

(56) References Cited

U.S. PATENT DOCUMENTS 5,099,343 A * 3/1992 Margerum et al. ............. 349/63
5,608,213 A    3/1997 Pinkus et al.
(Continued)

FOREIGN PATENT DOCUMENTS

EP        2 144 275 A2    1/2010
WO    WO 2008/134056 A1    11/2008
(Continued)

OTHER PUBLICATIONS

United States Office Action issued in U.S. Appl. No. 12/697,596 dated Aug. 29, 2011.
(Continued)

*Primary Examiner* — Anh Mai
*Assistant Examiner* — Fatima Farokhrooz
(74) *Attorney, Agent, or Firm* — RatnerPrestia

(57) ABSTRACT

A tube lamp has a tubular portion that serves both as a light guide for energy from a solid state source and as a container for a material bearing a nanophosphor that is pumped by the energy from the source as the energy traverses the light guide. However, the tubular portion of the light guide also allows emission of light produced by the phosphor when excited. The material with the nanophosphor dispersed therein may appear either clear or translucent when the lamp is off and the nanophosphor is not excited by energy from the source.

27 Claims, 9 Drawing Sheets

(51) Int. Cl.
*F21Y 103/00* (2016.01)
*F21Y 101/00* (2016.01)
*F21Y 103/10* (2016.01)
*F21Y 115/10* (2016.01)

(52) U.S. Cl.
CPC ....... *F21Y 2103/10* (2016.08); *F21Y 2115/10* (2016.08); *H05B 33/0857* (2013.01)

(56) References Cited

U.S. PATENT DOCUMENTS

| | | | |
|---|---|---|---|
| 5,749,646 A | 5/1998 | Britell | |
| 5,803,592 A | 9/1998 | Lawson | |
| 5,877,490 A | 3/1999 | Ramer et al. | |
| 5,914,487 A | 6/1999 | Ramer et al. | |
| 6,007,225 A | 12/1999 | Ramer et al. | |
| 6,222,623 B1 | 4/2001 | Wetherell | |
| 6,234,648 B1 | 5/2001 | Borner et al. | |
| 6,286,979 B1 | 9/2001 | Ramer et al. | |
| 6,352,350 B1* | 3/2002 | Ma | 362/19 |
| 6,357,889 B1 | 3/2002 | Duggal et al. | |
| 6,361,192 B1 | 3/2002 | Fussell et al. | |
| 6,422,718 B1 | 7/2002 | Anderson et al. | |
| 6,437,861 B1 | 8/2002 | Kuta | |
| 6,447,698 B1 | 9/2002 | Ihara et al. | |
| 6,473,554 B1 | 10/2002 | Pelka et al. | |
| 6,536,914 B2 | 3/2003 | Hoelen et al. | |
| 6,566,824 B2 | 5/2003 | Panagotacos et al. | |
| 6,580,228 B1 | 6/2003 | Chen et al. | |
| 6,608,657 B2* | 8/2003 | Hiyama et al. | 349/62 |
| 6,612,717 B2* | 9/2003 | Yen | 362/245 |
| 6,692,136 B2 | 2/2004 | Marshall et al. | |
| 6,700,112 B2 | 3/2004 | Brown | |
| 6,734,465 B1 | 5/2004 | Taskar et al. | |
| 6,737,681 B2 | 5/2004 | Koda | |
| 6,836,083 B2 | 12/2004 | Mukai | |
| 6,869,545 B2 | 3/2005 | Peng et al. | |
| 6,872,249 B2 | 3/2005 | Peng et al. | |
| 6,960,872 B2 | 11/2005 | Beeson et al. | |
| 6,969,843 B1 | 11/2005 | Beach et al. | |
| 6,985,163 B2 | 1/2006 | Riddle et al. | |
| 6,995,355 B2 | 2/2006 | Rains, Jr. et al. | |
| 7,025,464 B2 | 4/2006 | Beeson et al. | |
| 7,040,774 B2 | 5/2006 | Beeson et al. | |
| 7,102,152 B2 | 9/2006 | Chua et al. | |
| 7,105,051 B2 | 9/2006 | Peng et al. | |
| 7,144,131 B2 | 12/2006 | Rains | |
| 7,148,632 B2 | 12/2006 | Berman et al. | |
| 7,153,703 B2 | 12/2006 | Peng et al. | |
| 7,160,525 B1 | 1/2007 | Peng et al. | |
| 7,192,850 B2 | 3/2007 | Chen et al. | |
| 7,220,039 B2 | 5/2007 | Ahn et al. | |
| 7,235,190 B1 | 6/2007 | Wilcoxon et al. | |
| 7,235,792 B2 | 6/2007 | Elofson | |
| 7,259,400 B1 | 8/2007 | Taskar et al. | |
| 7,273,904 B2 | 9/2007 | Peng et al. | |
| 7,350,933 B2 | 4/2008 | Ng et al. | |
| 7,374,807 B2* | 5/2008 | Parce et al. | 428/76 |
| 7,510,299 B2 | 3/2009 | Timmermans et al. | |
| 7,531,149 B2 | 5/2009 | Peng et al. | |
| 7,543,961 B2 | 6/2009 | Arik et al. | |
| 7,560,677 B2 | 7/2009 | Lyons et al. | |
| 7,768,192 B2 | 8/2010 | Van De Ven et al. | |
| 7,845,825 B2 | 12/2010 | Ramer et al. | |
| 7,905,644 B2* | 3/2011 | Chen | 362/555 |
| 8,079,729 B2 | 12/2011 | Van De Ven et al. | |
| 8,274,241 B2 | 9/2012 | Guest et al. | |
| 8,350,499 B2 | 1/2013 | Nelson | |
| 8,573,807 B2 | 11/2013 | Borkar et al. | |
| 2002/0105285 A1 | 8/2002 | Loughrey | |
| 2004/0062041 A1* | 4/2004 | Cross et al. | 362/240 |
| 2004/0135504 A1 | 7/2004 | Tamaki et al. | |
| 2004/0151008 A1 | 8/2004 | Artsyukhovich et al. | |
| 2004/0188594 A1 | 9/2004 | Brown et al. | |
| 2004/0201990 A1 | 10/2004 | Meyer | |
| 2004/0212321 A1 | 10/2004 | Lys et al. | |
| 2005/0001565 A1 | 1/2005 | Loughrey | |
| 2005/0279915 A1* | 12/2005 | Elofson | 250/205 |
| 2006/0072314 A1 | 4/2006 | Rains | |
| 2006/0289884 A1 | 12/2006 | Soules et al. | |
| 2007/0034833 A1* | 2/2007 | Parce et al. | 252/301.36 |
| 2007/0045524 A1 | 3/2007 | Rains, Jr. et al. | |
| 2007/0051883 A1 | 3/2007 | Rains, Jr. et al. | |
| 2007/0070621 A1* | 3/2007 | Rivas et al. | 362/217 |
| 2007/0096118 A1 | 5/2007 | Mahalingam et al. | |
| 2007/0138978 A1 | 6/2007 | Rains, Jr. et al. | |
| 2007/0153518 A1 | 7/2007 | Chen | |
| 2007/0170454 A1 | 7/2007 | Andrews | |
| 2007/0183152 A1 | 8/2007 | Hauck et al. | |
| 2007/0228999 A1 | 10/2007 | Kit | |
| 2008/0020235 A1* | 1/2008 | Parce et al. | 428/690 |
| 2008/0024067 A1 | 1/2008 | Ishibashi | |
| 2008/0030974 A1 | 2/2008 | Abu-Ageel | |
| 2008/0043480 A1* | 2/2008 | Kong | 362/373 |
| 2008/0084706 A1 | 4/2008 | Roshan et al. | |
| 2008/0094835 A1 | 4/2008 | Marra et al. | |
| 2008/0106887 A1 | 5/2008 | Salsbury et al. | |
| 2008/0211419 A1 | 9/2008 | Garrity | |
| 2008/0224025 A1 | 9/2008 | Lyons et al. | |
| 2008/0237540 A1 | 10/2008 | Dubrow | |
| 2008/0246017 A1* | 10/2008 | Gillies et al. | 257/13 |
| 2008/0291670 A1* | 11/2008 | Rains | 362/231 |
| 2008/0315784 A1 | 12/2008 | Tseng | |
| 2009/0003002 A1 | 1/2009 | Sato | |
| 2009/0034292 A1 | 2/2009 | Pokrovskiy et al. | |
| 2009/0162011 A1* | 6/2009 | Coe-Sullivan et al. | 385/31 |
| 2009/0195186 A1 | 8/2009 | Guest et al. | |
| 2009/0268461 A1 | 10/2009 | Deak et al. | |
| 2009/0295266 A1 | 12/2009 | Ramer et al. | |
| 2009/0296368 A1 | 12/2009 | Ramer | |
| 2009/0302730 A1 | 12/2009 | Carroll et al. | |
| 2010/0002414 A1 | 1/2010 | Meir et al. | |
| 2010/0002453 A1 | 1/2010 | Wu et al. | |
| 2010/0053970 A1* | 3/2010 | Sato et al. | 362/259 |
| 2010/0053977 A1 | 3/2010 | Chen | |
| 2010/0123155 A1* | 5/2010 | Pickett et al. | 257/98 |
| 2010/0124058 A1* | 5/2010 | Miller | 362/249.02 |
| 2010/0276638 A1* | 11/2010 | Liu et al. | 252/301.35 |
| 2010/0277059 A1* | 11/2010 | Rains et al. | 313/502 |
| 2010/0301728 A1 | 12/2010 | Helbing et al. | |
| 2011/0095686 A1 | 4/2011 | Falicoff et al. | |
| 2011/0140593 A1 | 6/2011 | Negley et al. | |
| 2011/0175528 A1 | 7/2011 | Rains, Jr. et al. | |
| 2011/0176316 A1 | 7/2011 | Phipps | |
| 2012/0176804 A1 | 7/2012 | Bohler et al. | |

FOREIGN PATENT DOCUMENTS

WO  WO 2008/155295 A1  12/2008
WO  WO 2009/137053 A1  11/2009

OTHER PUBLICATIONS

United States Office Action issued in U.S. Appl. No. 12/729,788 dated May 11, 2011.
International Search Report and the Written Opinion of the International Searching Authority issued in International Patent Application No. PCT/US2010/028159 dated Jun. 1, 2010.
Pradhan, Narayan, et al., "An Alternative of CdSe Nanocrystal Emitters: Pure and Tunable Impurity Emissions in ZnSe Nonocrystals", Nov. 24, 2005, 127, pp. 17586-17587, J. A, Chem, Soc. Communications, web publication.
"Energy Star Program Requirements for Solid State Lighting Luminaires Eligibility Criteria—Version 1.0", Manual, Sep. 12, 2007.
Yin, Yadong and A. Paul Alivisatos, "Colloidal nanocrystal sythesis and the organic-inorganic interface", Insight Review, Sep. 25, 2005, pp. 664-670, Nature vol. 437.
"Final Report: Highly Bright, Heavy Metal-Free, and Stable Doped Semiconductor Nanophosphors for Economical Solid State Lighting Alternatives", Report, Nov. 12, 2009, pp. 1-3, National Center for Environmental Research, web publication.

(56) References Cited

OTHER PUBLICATIONS

"Solid-State Lighting: Development of White LEDs Using Nanophosphor-InP Blends", Report, Oct. 26, 2009, p. 1, U.S. Department of Energy—Energy Efficiency and Renewable Energy, web publication.

"Solid-State Lighting: Improved Light Extraction Efficiencies of White pc-LEDs for SSL by Using Non-Toxic, Non-Scattering, Bright, and Stable Doped ZnSe Quantum Dot Nanophosphors (Phase I)", Report, Oct. 26, 2009,pp. 1-2, U.S. Department of Energy—Energy Efficiency and Renew able Energy, web publication.

"Chemistry—All in the Dope", Editor's Choice, Dec. 9, 2005, Science, vol. 310, p. 1, AAAS, web publication.

"D-dots: Heavy Metal Free Doped Semiconductor Nanocrystals", Technical Specifications, etc. Dec. 1, 2009, pp. 1-2, NN-LABS, LLC (Nanomaterials & Nanofabrication Laboratories), CdSe/ZnS Semiconductor Nanocrystals, web publication.

U.S. Appl. No. 12/629,614, filed Dec. 2, 2009 with Official Filing Receipt and New Utility Transmittal.

V. Ya Rudyak et al., "On the Viscosity of Rarefied Gas Suspensions Containing Nanoparticles," Doklady Physics, vol. 48, No. 10, 2003, pp. 583-586.

LED *Lumen-Starr* Lamp Tubes; LED LS-1007; DM Technology & Energy, Inc.

International Search Report and Written Opinion of the International Searching Authority issued in International Patent Application No. PCT/US2011/027179 dated Jul. 14, 2011.

United States Notice of Allowance issued in U.S. Appl. No. 12/940,634 dated Aug. 10, 2011.

Entire Prosecution history of U.S. Appl. No. 12/697,596, filed Feb. 1, 2010 entitled Lamp Using Solid State Source and Doped Semiconductor Nanophosphor.

Entire Prosecution history of U.S. Appl. No. 13/040,395, filed Mar. 4, 2011 entitled Lamp Using Solid State Source and Doped Semiconductor Nanophosphor.

United States Office Action, issued in U.S. Appl. No. 13/040,395, dated Feb. 8, 2012.

United States Notice of Allowance, issued in U.S. Appl. No. 12/697,596, dated Dec. 16, 2011.

United States Notice of Allowance issued in U.S. Appl. No. 12/697,596 dated Apr. 2, 2012.

United States Notice of Allowance issued in U.S. Appl. No. 13/040,395 dated Aug. 15, 2012.

Notice of Allowance issued in the U.S. Appl. No. 13/040,395 dated Oct. 10, 2013.

Ex Parte Quayle action cited in U.S. Appl. No. 13/915,909 dated Dec. 4, 2013.

Mike Rutherford, opinion letter dated Sep. 10, 2013, regarding U.S. Pat. No. 7,723,744 by Gillies.

Mike Rutherford, opinion letter dated Sep. 8, 2013, regarding U.S. Pat. No. 6,734,465 by Taskar.

Non-final Office Action dated Oct. 6, 2014, issued in U.S. Appl. No. 14/310,518, entitled "Lamp Using Solid State Source," filed Jun. 20, 2014.

Notice of Allowance dated Nov. 24, 2014, issued in U.S. Appl. No. 14/310,518, entitled "Lamp Using Solid State Source," filed Jun. 20, 2014.

Non-final Office Action dated Sep. 9, 2015, issued in U.S. Appl. No. 14/618,668, entitled "Lamp Using Solid State Source," filed Feb. 10, 2015.

Notice of Allowance dated Oct. 23, 2015, issued in U.S. Appl. No. 14/618,668, entitled "Lamp Using Solid State Source," filed Feb. 10, 2015.

Notice of Allowance issued in the U.S. Appl. No. 13/040,395 dated Mar. 3, 2014.

Notice of Allowance issued in the U.S. Appl. No. 13/915,909 dated Feb. 20, 2014.

* cited by examiner

TUBULAR LIGHTING PRODUCTS USING SOLID STATE SOURCE AND SEMICONDUCTOR NANOPHOSPHOR, E.G. FOR FLORESCENT TUBE REPLACEMENT

RELATED APPLICATIONS

This application is also a continuation in part of U.S. application Ser. No. 12/697,596 Filed Feb. 1, 2010 now U.S. Pat. No. 8,212,469 entitled "Lamp Using Solid State Source and Doped Semiconductor Nanophosphor," the disclosure of which is entirely incorporated herein by reference.

TECHNICAL FIELD

The present subject matter relates to tubular lighting products for general lighting applications, for example, for florescent tube replacement, where the tubular lamp element of such a product utilizes a solid state source to pump one or more semiconductor nanophosphors, to produce light of desired characteristics, yet can conform to form factors and/or connectors of widely accepted tubular lamp designs, such as those of florescent tubes.

BACKGROUND

There are many lighting applications that utilize tubular style lamps to generate light. For many general lighting type applications, the tubular lamps are florescent type lamp products. A florescent lamp typically utilizes mercury vapor and a phosphor coating, inside a glass tube. Current from a ballast drives one or more electrodes, typically at the opposite ends of the tube, to excite the mercury vapor to produce ultraviolet (UV) energy. The UV in turn excites phosphor particles in the coating on the interior surface of the tube to emit a spectrum of visible light. Use of the toxic mercury vapor represents a potential environmental hazard in terms of disposal of the tube lamp and/or in the event of accidental breakage.

Also, the spectral characteristic of the light output may be somewhat undesirable, with regard to color temperature and/or color rendering index. The apparent color of the white light output (corresponding to color temperature) may seem unnatural; and a poor color rendering index (CRI) may result in less than desirable illumination of objects of certain colors. The output spectrum of the florescent tubular lamp product is determined by the output spectrum or spectra of the excited phosphors. Improvement in the characteristics of the phosphors and/or adding phosphors with different output spectra may improve the spectral characteristic of the output of the florescent tube lamp, but these solutions often increase costs. Particularly in less costly products, the white light output still often has a somewhat undesirable color temperature and/or a relatively low color rendering index (CRI), so that the output or illumination of some objects with such light appears unnatural and undesirable to many people. Because of the energy efficiency of the tubular florescent lighting products and the like, however, they have been widely adopted, particularly in commercial settings.

Hence, it would be useful to find an alternative technology that is more environmentally friendly and at least for white light applications would provide a higher quality/more desirable spectral characteristic of white light. Of course, any such alternative technology should be as energy efficient as possible, for example, at least more efficient than existing alternatives such as incandescent lamps.

Recent years have seen a rapid expansion in the performance of solid state lighting devices such as light emitting diodes (LEDs); and with improved performance, there has been an attendant expansion in the variety of applications for such devices. For example, rapid improvements in semiconductors and related manufacturing technologies are driving a trend in the lighting industry toward the use of LEDs or other solid state light sources to produce light for general lighting applications to meet the need for more efficient lighting technologies and to address ever increasing costs of energy along with concerns about global warming due to consumption of fossil fuels to generate energy. LED solutions also are more environmentally friendly than competing technologies, such as florescent lamps, because LED based lighting products do not include any toxic mercury vapor.

The actual solid state light sources, however, produce light of specific limited spectral characteristics. To obtain white light of a desired characteristic and/or other desirable light colors, one approach uses sources that produce light of two or more different colors or principal wavelengths and one or more optical processing elements to combine or mix the light of the various wavelengths to produce the desired characteristic in the output light. However, because the resultant light is a mixture of a number of narrow spectra from the source LEDs, resultant light for example exhibits a relatively low CRI, even when the color or color temperature is of a desired characteristic.

In recent years, techniques have also been developed to shift or enhance the characteristics of light generated by solid state sources using phosphors, including for generating white light using LEDs. Phosphor based techniques for generating white light from LEDs, currently favored by LED manufacturers, include UV or Blue LED pumped phosphors. In addition to traditional phosphors, semiconductor nanophosphors have been used more recently. The phosphor materials may be provided as part of the LED package (on or in close proximity to the actual semiconductor chip), or the phosphor materials may be provided remotely (e.g. on or in association with a macro optical processing element such as a diffuser or reflector outside the LED package). The remote phosphor based solutions have advantages, for example, in that the color characteristics of the fixture output are more repeatable, whereas solutions using sets of different color LEDs and/or lighting fixtures with the phosphors inside the LED packages tend to vary somewhat in light output color from fixture to fixture, due to differences in the light output properties of different sets of LEDs (due to lax manufacturing tolerances of the LEDs).

LED devices also have been suggested as replacements for tubular lamps, such as the tubes commonly used in florescent lighting fixtures. A LED light tube for replacing a florescent tube might include a tubular glass bulb and a pair of end caps for connection through a standard socket to an appropriate power supply. Light emitting diodes disposed inside the tubular glass bulb receive power from the supply through the end caps. The LEDs may be visible light LEDs. It has also been suggested that UV LEDs might be used to pump phosphors or quantum dots coated on an interior surface of a glass bulb, which in the context of a tubular lamp would be on an interior surface of the tubular glass bulb.

Hence, solid state lighting technologies have advanced considerably in recent years, and such advances have encompassed any number of actual LED based tubular lamp products as well as a variety of additional proposals for LED based tubular lamps. However, there is still room for further improvement in the context of tubular solid state lamp products, which for example might be adopted as replacements for conventional florescent lamps or other tubular lamps.

For example, for general lighting applications, it is desirable to provide light outputs of acceptable characteristics (e.g. white light of a desired color rendering index and/or color temperature) in a consistent repeatable manner from one instance of a lamp product to another. Of course, to be commercially competitive with alternative lamp technologies requires an elegant overall solution. For example, the product should be as simple as possible so as to allow relatively low cost manufacturing. Relatively acceptable/ pleasing form factors similar to those of well accepted tubular lamps may be desirable. Solid state devices have advantages of relatively high dependability and long life. However, within the desired tubular lamp form factor/ configuration or a fixture or system incorporating such a tubular lamp, there are a variety of technical issues relating to use of solid state devices that still must be met, such as efficient electrical drive of the solid state light emitters, efficient processing of the light for the desired output and/or adequate dissipation of the heat that the solid state devices generate.

SUMMARY

The detailed description and drawings disclose a number of examples of tubular lamps and lighting fixtures or systems using such lamps, intended to address one, some or all of the needs for improvements and/or to provide some or all of the commercially desirable characteristics outlined above. A tubular portion of the lamp serves both as a light guide for energy from a solid state source and a container for a material bearing a phosphor that is pumped by the energy from the source as the energy traverses the light guide. However, the tubular portion of the light guide also allows emission of light produced by the phosphor when excited.

By way of an example disclosed in detail below, a tubular lamp for producing visible light includes a solid state source of electromagnetic energy and a tubular container formed of optically transmissive material. The tubular container is coupled to receive electromagnetic energy from the solid state source, and the container has a longitudinal section configured to act as a light guide with respect to the electromagnetic energy received from the solid state source. A bearer material fills an interior volume of the tubular container, at least to a substantial degree. In this example, the lamp also includes one or more semiconductor nanophosphors dispersed in the bearer material in the container. Each doped semiconductor nanophosphor is of a type excited in response to the electromagnetic energy received from the solid state source for re-emitting visible light. The longitudinal section of the tubular container is also configured to allow emission of light produced by excitation of the doped semiconductor nanophosphor when excited by the electromagnetic energy received from the solid state source.

As another example, the detailed description also discloses examples of a tubular lamp for producing visible white light. Such a lamp product might include a solid state source and a tubular container, forming a light guide for energy from the source and containing a bearer material with a number of semiconductor nanophosphors dispersed in the bearer material. In this example, each of the semiconductor nanophosphors is of a type excited in response to the electromagnetic energy from the solid state source for re-emitting visible light of a different spectrum. When excited, the semiconductor nanophosphors together produce visible white light for output from the tubular lamp through the longitudinal section of the tubular container.

When two, three or more nanophosphors are used in either example, the visible light in the output for the lamp may be at least substantially white and have a color rendering index (CRI) of 75 or higher. For general white lighting applications, it may also be desirable for the light output to have a color temperature in one of the following ranges: 2,725±145° Kelvin; 3,045±175° Kelvin; 3,465±245° Kelvin; and 3,985±275° Kelvin.

Various nanophosphors and bearer materials are discussed. Although the material may be solid, use of a gas or liquid may further improve the efficiency of the phosphor excitation. The material with the one or more doped semiconductor nanophosphors dispersed therein may appear at least substantially clear when the solid state source is off, or that material may appear at least substantially translucent when the solid state source is off.

In the examples, the solid state source has an emission rating wavelength $\lambda$ in the range of around 460 nm and below ($\lambda \leq 460$ nm). In several more specific example, the solid state source is a near ultraviolet (UV) solid state source for producing near UV electromagnetic energy in a range of 380-420 nm. Although other solid state sources are contemplated, the specific examples shown in the drawings utilize one or more light emitting diodes (LEDs).

The tubular container provides a remote deployment of the nanophosphor(s) in that the nanophosphor(s) is separate and apart from the solid state source. In examples using one or more LEDs, the nanophosphor(s) would be outside of any housing or other package(s) of the LED(s).

The lamp in such an implementation may also incorporate a number of other technologies. For example, to address cooling issues, a lamp might include a heat dissipater within the base for receiving and dissipating heat produced by the LEDs during operation. Active and/or or passive heat dissipation are contemplated. For example, the heat dissipater may comprise a heat sink coupled to receive the heat produced by the LEDs during operation. The housing of the base may have one or more air vents. By way of example of active cooling, the heat dissipater might further include a membronic cooling element for circulating air through the vent and across the heat sink.

In some examples, the LEDs are driven directly off the AC supply. In other examples, AC is converted to DC to drive the LEDs. Implementations for use in DC-based lighting systems are also contemplated.

The light guide may be formed in a number of different ways. For example, the material and configuration of the tubular section may produce total internal reflection with regard to electromagnetic energy traveling longitudinally, in which case, the source can supply the pumping energy from an end of the tube in the longitudinal direction. Phosphor emissions, however, impact the tube wall at a steeper angle and pass through without being subject to total internal reflection. As another example, the light guide may be implemented by provision of a partially transmissive partially reflective reflector 18 along the inner surface of the tubular section of the container. This reflector tends to be reflective to light hitting it at shallow angles, in this case the energy from the solid state source, but it passes light through at steeper incident angles, including light emitted by the excited phosphors. In either of these examples, the tubular light guide/container may have a reflector at one or both ends.

Tubular lamps and lighting fixtures or systems using such lamps disclosed herein and in the accompanying drawings may realize one or more of the following advantages: high efficiency, particularly when compared to incandescent lamps; less hazardous to the environment than florescent lamps in that they include no mercury; simple drive circuitry, because the lamp can use only one type of solid state device and need not adjust sources of different colors to achieve a desired output light property; long service life; high quality light properties, such as desirable color temperature and CRI in the white light examples; and options for a form factor similar to any of a variety of common well accepted products such as those of florescent lamps.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
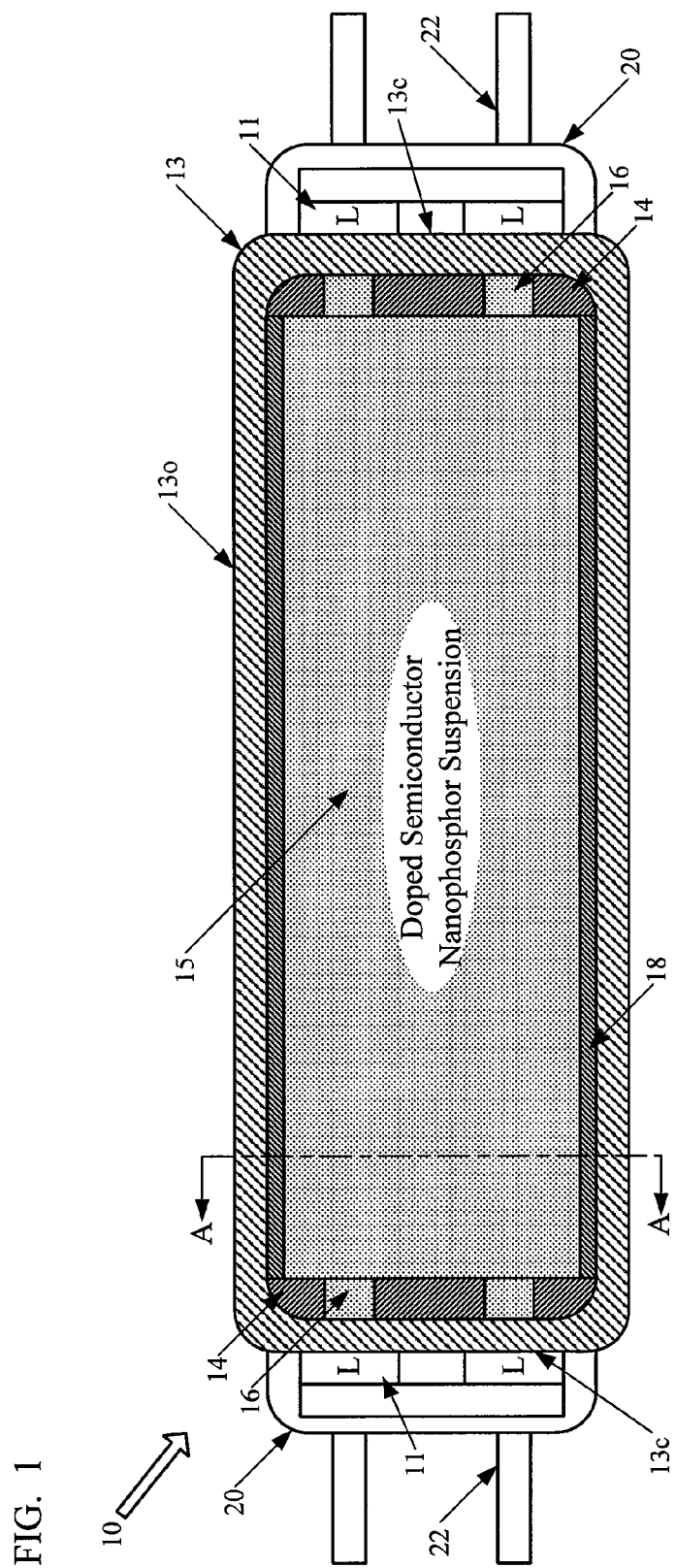
FIG. 1 a cross-sectional view of a first example of a tubular solid state lamp, for lighting applications, which uses a solid state source and one or more semiconductor nanophosphors pumped by energy from the source to produce visible light.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples below relate to solid state tube type lamps and fixtures or systems that utilize such lamps. An exemplary lamp may have a tubular portion or element that serves both as a light guide for energy from a solid state and as a container for a material bearing a nanophosphor that is pumped by the energy from the source as the energy traverses the light guide. However, the tubular longitudinal section of the light guide also allows emission of light produced by the phosphor when excited. The material with the nanophosphor dispersed therein may appear either clear or translucent when the lamp is off and the nanophosphor is not excited by energy from the source.

Before discussing structural examples, it may be helpful to discuss the types of phosphors of interest here. Semiconductor nanophosphors are nanoscale crystals or "nanocrystals" formed of semiconductor materials, which exhibit phosphorescent light emission in response to excitation by electromagnetic energy of an appropriate input spectrum (excitation or absorption spectrum). Examples of such nanophosphors include quantum dots (q-dots) formed of semiconductor materials. Like other phosphors, quantum dots and other semiconductor nanophosphors absorb light of one wavelength band or spectrum and re-emit light at a different band of wavelengths or spectrum. However, unlike conventional phosphors, optical properties of the semiconductor nanophosphors can be more easily tailored, for example, as a function of the size of the nanocrystals. In this way, for example, it is possible to adjust the absorption spectrum and/or the emission spectrum of the semiconductor nanophosphors by controlling crystal formation during the manufacturing process so as to change the size of the nanocrystals. For example, nanocrystals of the same material, but with different sizes, can absorb and/or emit light of different colors. For at least some semiconductor nanophosphor materials, the larger the nanocrystals, the redder the spectrum of re-emitted light; whereas smaller nanocrystals produce a bluer spectrum of re-emitted light.

Doped semiconductor nanophosphors are somewhat similar in that they are nanocrystals formed of semiconductor materials. However, this later type of semiconductor phosphor is doped, for example, with a transition metal or a rare earth metal. The doped semiconductor nanophosphors used in several specific examples of tubular solid state lamps discussed herein are configured to convert energy in a range somewhere in the spectrum at about 460 nm and below into wavelengths of light, and several such nanophosphors can be used together to produce a desirable characteristic of visible light for the fixture output. A number of specific examples produce high CRI visible white light emission.

Semiconductor nanophosphors, including doped semiconductor nanophosphors, may be grown by a number of techniques. For example, colloidal nanocrystals are solution-grown, although non-colloidal techniques are possible.

For some lighting applications where a single color is desirable rather than white, the fixture might use a single type of nanophosphor in the material. For a yellow 'bug lamp' type application, for example, the one nanophosphor would be of a type that produces yellow emission in response to pumping energy from the solid state source. For a red light type application, as another example, the one nanophosphor would be of a type that produces predominantly red light emission in response to pumping energy from the solid state source. A variety of implementations, using a single phosphor are possible, so that the light output can be a relatively monochromatic color. Some applications may use a phosphor providing a somewhat broad spectrum output, e.g. using a phosphor offering somewhat pastel color output. Other applications may use a different phosphor offering a purer color output for a saturated color, for example, as a replacement for a neon lamp. Many examples, however, will include two, three or more nanophosphors dispersed in the gas, so that the emissions spectra of the nanophosphors may be combined to produce an overall emission spectra in the fixture output that is desirable for a particular lighting application.

For a high CRI type white light application, a bearer material containing or otherwise including semiconductor nanophosphors, of the type discussed in many of the examples herein, would contain several different types of semiconductor nanocrystals sized and/or doped so as to be excited by the light energy in the relevant part of the spectrum. In several examples, absorption spectra of the nanophosphors have upper limits somewhere between 430 and 460 nm (nanometers), and the lamps use LEDs rated to emit light in a comparable portion of the spectrum. The different types of nanocrystals (e.g. semiconductor material, crystal size and/or doping properties) in the mixture are selected by their emission spectra, so that together the excited nanophosphors provides the high CRI white light of a rated color temperature when all are excited by the energy from the relevant type of solid state source. Relative proportions in the mixture may also be chosen to help produce the desired output spectrum for a particular lighting specification or application.

Doped semiconductor nanophosphors exhibit a relatively large Stokes shift, from lower wavelength of absorption spectra to higher wavelength emissions spectra. In several specific white light examples, each of the phosphors is of a type excited in response to near UV electromagnetic energy in the range of 380-420 nm and/or UV energy in a range of 380 nm and below. Each type of nanophosphor re-emits visible light of a different spectral characteristic, and each of the phosphor emission spectra has little or no overlap with excitation or absorption ranges of the nanophosphors dispersed in the bearer material. Because of the magnitudes of the shifts, the emissions are substantially free of any overlap with the absorption spectra of the phosphors, and re-absorption of light emitted by the phosphors can be reduced or eliminated, even in applications that use a mixture of a number of such phosphors to stack the emission spectra thereof so as to provide a desired spectral characteristic in the combined light output.

Although sometimes referred to below simply as white light for convenience, the light produced by excitation of the two or more semiconductor nanophosphors in the white light examples is "at least substantially" white in that it appears as visible white light to a human observer, although it may not be truly white in the electromagnetic sense in that it may exhibit some spikes or peaks and/or valleys or gaps across the relevant portion of the visible spectrum and/or may differ from a black body spectrum.

At least in the white light examples, the light output may have a relatively high quality, such as a high CRI. The CIE color rendering index or "CRI" is a standardized measure of the ability of a light source to reproduce the colors of various objects, based on illumination of standard color targets by a source under test for comparison to illumination of such targets by a reference source. CRI, for example, is currently used as a metric to measure the color quality of white light sources for general lighting applications. Presently, CRI is the only accepted metric for assessing the color rendering performance of light sources. However, it has been recognized the CRI has drawbacks that limit usefulness in assessing the color quality of light sources, particularly for LED based lighting products. NIST has recently been work on a Color Quality Scale (CQS) as an improved standardized metric for rating the ability of a light source to reproduce the colors of various objects. The color quality of the white light produced by the systems discussed herein is specified in terms of CRI, as that is the currently available/accepted metric. Those skilled in the art will recognize, however, that the systems may be rated in future by corresponding high measures of the quality of the white light outputs using appropriate values on the CQS once that scale is accepted as an appropriate industry standard. Of course, other even more accurate metrics for white light quality measurement may be developed in future.

The solid state/remote phosphor lamp technologies discussed herein, including tubular type lamps and light fixtures or systems using such lamp product, can be configured for general lighting applications. Examples of general lighting applications that may use the tubular lamps include downlighting, task lighting, "wall wash" lighting, emergency egress lighting, as well as illumination of an object or person in a region or area intended to be occupied by one or more people.

As discussed herein, applicable solid state light emitting elements or sources essentially include any of a wide range of light emitting or generating devices formed from organic or inorganic semiconductor materials. Examples of solid state light emitting elements include semiconductor laser devices and the like. Many common examples of solid state sources, however, are classified as types of "light emitting diodes" or "LEDs." This exemplary class of solid state sources encompasses any and all types of semiconductor diode devices that are capable of receiving an electrical signal and producing a responsive output of electromagnetic energy. Thus, the term "LED" should be understood to include light emitting diodes of all types, light emitting polymers, organic diodes, and the like. LEDs may be individually packaged, as in the illustrated examples. Of course, LED based devices may be used that include a plurality of LEDs within one package, for example, multi-die LEDs having two, three or more LEDs within one package. Those skilled in the art will recognize that "LED" terminology does not restrict the source to any particular type of package for the LED type source. Such terms encompass LED devices that may be packaged or non-packaged, chip on board LEDs, surface mount LEDs, and any other configuration of the semiconductor diode device that emits light. Solid state sources may include one or more phosphors and/or quantum dots, which are integrated into elements of the package or light processing elements of the fixture to convert at least some radiant energy to a different more desirable wavelength or range of wavelengths.

The examples use one or more LEDs to supply the energy to excite the nanophosphors. The solid state source in such cases may be the collection of the LEDs. Alternatively, each LED may be considered a separate solid state source. Stated another way, a source may include one or more actual emitters.

With that general introduction, reference now is made in detail to the examples illustrated in the accompanying drawings and discussed below. FIG. 1 illustrates the first example of a tubular solid state lamp 10, in cross section. The drawing is not to scale but rather shows sizes and relative dimensions in a manner intended to be easy for a reader to observe and understand rather than in a manner that might represent dimensions or proportions as might be used to manufacture an actual tubular lamp product. Also, the orientation of the lamp 10 is given for purposes of a convenient illustration, and those skilled in the art will recognize that the lamp may be deployed in any orientation suitable to a particular application.

The exemplary lamp 10 may be utilized in a variety of lighting applications. The lamp, for example includes a solid state source for producing electromagnetic energy. The solid state source is a semiconductor based structure for emitting electromagnetic energy of one or more wavelengths within the range. For example, the source may comprise one or as illustrated more light emitting diode (LED) devices 11, although other semiconductor devices might be used. Hence, in the example of FIG. 1, the source takes the form of a number of LEDs 11. Although the LEDs could be at one end only, the exemplary tube lamp 10 includes a number of LEDs at each of the opposite ends of the tubular structure 13. The tubular structure 13 in this example serves as a container for a material 15 having nanophosphor dispersed therein. The tubular container is configured as a light guide with respect to energy from the LEDs 11 longitudinally traversing the tube. However, the light guide or container 13 also allows transmissive emission of light produced by the nanophosphor when excited. The tube may have a variety shapes, although in many cases, it may be configured to offer an outer form factor the same as or similar to a prior tubular lamp that it is intended to replace, such as a form factor of a florescent lamp.

It is contemplated that the LEDs 11 could be of any type rated to emit energy of wavelengths from the blue/green region around 460 nm down into the UV range below 380 nm. As discussed below, the exemplary nanophosphors have absorption spectra having upper limits somewhere between 430 and 460 nm, although other doped semiconductor nanophosphors may have somewhat higher limits on the wavelength absorption spectra and therefore may be used with LEDs or other solid state devices rated for emitting wavelengths as high as say 460 nm. In the specific examples, particularly those for white light lamp applications, the LEDs 11 are near UV LEDs rated for emission somewhere in the 380-420 nm range, although UV LEDs could be used alone or in combination with near UV LEDs even with the exemplary nanophosphors. A specific example of a near UV LED, used in several of the specific white lamp examples, is rated for 405 nm emission.

The structure of a LED includes a semiconductor light emitting diode chip, within a package or enclosure. A transparent portion (typically formed of glass, plastic or the like), of the package that encloses the chip, allows for emission of the electromagnetic energy in the desired direction. Many such source packages include internal reflectors to direct energy in the desired direction and reduce internal losses. Each LED 11 is rated for emitting electromagnetic energy at a wavelength in the range of around 460 nm and below ($\lambda \leq 460$ nm). For a white light lamp example, the LEDs might be rated to emit UV of 380 nm or less, or the LEDs might be rated to near UV electromagnetic energy of a wavelength in the 380-420 nm range, such as 405 nm. Semiconductor devices such as the LEDs 11 exhibit emission spectra having a relatively narrow peak at a predominant wavelength, although some such devices may have a number of peaks in their emission spectra. Often, manufacturers rate such devices with respect to the intended wavelength of the predominant peak, although there is some variation or tolerance around the rated value, from device to device. LED devices, such as devices 11, for use in a lamp 10, will have a predominant wavelength in the range at or below 460 nm. For example, each LED 11 in the example of FIG. 1 may rated for a 405 nm output, which means that it has a predominant peak in its emission spectra at or about 405 nm (within the manufacturer's tolerance range of that rated wavelength value). The lamp 10, however, may use devices that have additional peaks in their emission spectra. The structural configuration of the LEDs 11 of the solid state source is presented above by way of example only.

One or more doped semiconductor nanophosphors are used in the lamp 10 to convert energy from the source into visible light of one or more wavelengths to produce a desired characteristic of the visible light output of the tubular lamp. The doped semiconductor nanophosphors are remotely deployed, in that they are outside of the individual device packages or housings of the LEDs 11. For this purpose, the exemplary lamp includes a tubular container structure 13 formed of optically transmissive material coupled to receive near UV electromagnetic energy from the LEDs 11 forming the solid state source(s). The tubular structure 13 forming the container includes two ends joined by a longitudinal section. Although other shapes may be used, the example assumes a generally cylindrical tube shape. Hence, the ends closing the tube are circular, and the longitudinal section is cylindrical (shown as having a circular cross-section the view of FIG. 2A).

The tubular container structure 13 contains a material bearing the nanophosphor(s), as shown in the drawing at 15, which at least substantially fills the interior volume of the container. For example, if a liquid is used, there may be some gas in the container as well, although the gas should not include oxygen as oxygen tends to degrade the nanophosphors. In this example, the lamp 10 includes at least one semiconductor nanophosphor dispersed in the material in the container.

The material may be a solid, although liquid or gaseous materials may help to improve the florescent emissions by the nanophosphors in the material. For example, alcohol, oils (synthetic, vegetable, silicon or other oils) or other liquid media may be used. A silicone material, however, may be cured to form a hardened material, at least along the exterior (to possibly serve as an integral container), or to form a solid throughout the internal volume of the container 13. If hardened silicon is used, however, a glass container still may be used to provide an oxygen barrier to reduce nanophosphor degradation due to exposure to oxygen.

If a gas is used, the gaseous material, for example, may be hydrogen gas, any of the inert gases, and possibly some hydrocarbon based gases. Combinations of one or more such types of gases might be used.

The dispersion of one or more nanophosphors in a gas may help to improve the efficiency of the phosphorescent emissions by each nanophosphor. The lighting industry has long used various gases in commercial lamp products and is quite familiar with techniques for manufacturing gas based products. So, manufacturing of tubular lamps that have a gas to bear the nanophosphors should be relatively easy to understand and implement in an efficient, practical manner. In the specific examples, the combination of a nanophosphor that has an emission spectrum that is separated from its absorption spectrum with a relatively transparent gas results in a nanophosphor suspension that exhibits little or no perceptible tint, when observed by a person while the light fixture is off. This can be a highly desirable feature for lamps intended for commercial light fixture products for general lighting applications and the like.

Hence, although the material in the container may be a solid, further discussion of the examples will assume use of a liquid or gaseous material. The lamp 10 in the first example includes a tubular container 13 which also forms the outer bulb form factor of the main portion of the tube lamp 10, although there could be a separate container of glass or plastic with a bulb enclosure outside the container. In this first example, however, the tubular structure of the bulb 13 serves as the container, and we will assume that the container is formed of glass.

The container wall(s) are transmissive with respect to at least a substantial portion of the visible light spectrum, at least when impacting the surfaces thereof at appropriate angles. As will become apparent, some internal reflection is used in the lamp 10. Some or all of the desired reflection could take the form of internal reflection. However, such an arrangement may require a relatively narrow and elongated tube configuration. Hence, in the example, selected surfaces inside the tube have various reflective materials to provide the desired optical properties.

The glass of the container 13 will be thick enough, to provide ample strength to contain a liquid or gas type bearer material if used to bear the doped semiconductor nanophosphors in suspension, as shown at 15. However, the material of the tubular container 13 will allow transmissive entry of energy from the LEDs 11 to reach the nanophosphors in the material 15 and will allow transmissive output of visible light principally from the excited nanophosphors.

The glass bulb/container 13 receives energy from the LEDs 11 through a surface of the bulb, referred to here as an optical input coupling surface 13c. In the doubled-ended tube lamp example of FIG. 1, the tube 13 has a similar coupling surface 13c at each of the tube. The example shows each surface 13c as a flat surface, although obviously outer contours may be used. Light output from the lamp 10 emerges through one or more other surfaces of the bulb 13, referred to here as output surface 13o. In an elongated tubular lamp like the lamp 10 of FIG. 1, most of the output surface is along the outer periphery of the cylindrical longitudinal section of the tubular container 13. In the example, the tubular bulb container 13 here is glass, although other appropriate transmissive materials may be used. For a diffuse outward appearance of the bulb, the output surface(s) 13o may be frosted white or translucent, although the optical input coupling surface 13c might still be transparent to reduce reflection of energy from the LEDs 11 back towards the LEDs. Alternatively, the output surface 13o may be transparent.

In the example, internal end surfaces of the tubular container are specular with respect to light inside the tubular bulb 13, for example, due to coating thereof with a specular reflective material to form an internal reflector as shown at 14 in FIG. 1. However, to allow entry of light from the LEDs 11, sections of the end surfaces of the tubular container are free of the specular reflective coating 14 so as to form optical passages 16 from the input coupling surface 13c into the interior of the container 13. Although shown as a relatively thick layer for ease of illustration in the drawing, the specular coating forming each end reflector 14 may be relatively thin. Other reflective end configurations are possible. For example, the material of the end of the container may include a reflector or itself be reflective in some way.

Figure 2A:
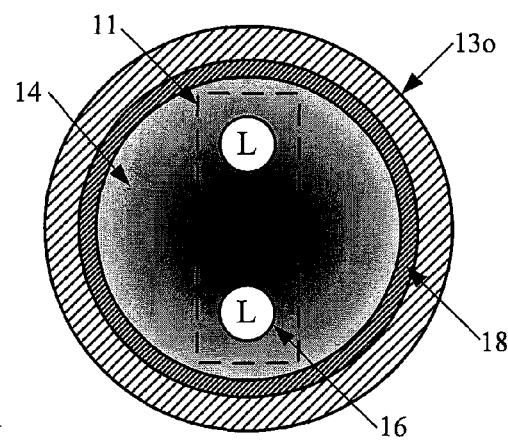
FIG. 2A is a cross-sectional view of the tubular longitudinal section of the lamp taken along line A-A of FIG. 1.

In the cross-sectional view of FIG. 2A, the optical passages 16 through the specular reflector 16 are circular. The dotted lines represent approximately square outer casings of the LEDs. The optical apertures 16 would correspond to or may be somewhat larger than the actual optical outputs of the LEDs 11. Of course, other configurations of the LEDs 11 and the apertures 16 are possible, for example, if a different LED product is used in a particular tube lamp.

Light entering the container 13 from the LEDs 11 via the optical apertures or passages 16 will be directed at least initially in relatively axial direction along the length of the tube. With respect to that light, the longitudinal section of the tubular structure of the container 13 is configured to act as a light guide.

The light guide functionality may be implemented in a number of ways. For example, the container tube 13 could be formed of a light transmissive material having an index of refraction that is higher than that of the ambient environment, typically air. Such a tube 13 could then be configured so that most light from the sources passes axially through the tube or at most is directed toward a side of the tube 13 at a relatively shallow angle with respect to the sidewall of the element. As a result, total internal reflection (TIR) from the side surface(s) of such a tube implementation might be realized with the positioning of the LEDs to directed light through the openings 16 in the specular surfaces 14.

In the example, however, the light guide functionality of the tubular container 13 is implemented or enhanced by provision of a partially transmissive partially reflective reflector 18 on the inner surface of the longitudinal section of the tubular container structure 13. The reflector 18 tends to be reflective to light hitting it at shallow angles but passes light through at steeper incident angles. For example, the inner longitudinal surface of the tube (presumed cylindrical for discussion purposes) may be lined with 3M™ Optical Lighting Film, which is a micro-replicated prismatic film that is transmissive with respect to light striking the surface of the film at steep angles. However, that film also is highly reflective with respect to light striking the surface of the film at shallow incident angles. As with the reflector 14, the film 18 is shown as a relatively thick layer for ease of illustration in the drawing, but the firm or similar coating on the sidewall of the longitudinal section of the container 13 may be relatively thin.

Those skilled in the art will recognize that tubular light guides such as the container 13 may be made of a variety of materials/structures having the desired optical properties. For example, at least the cylindrical main portion of the structure 13 forming the tube could be made from a 3M™ Light Pipe, which is a transparent tube lined with the 3M™ Optical Lighting Film. The ends of the Light Pipe would be sealed by appropriate means to seal the container and would have the specular reflective coating 14 and the transmissive openings 16 at appropriate locations, like those of FIGS. 1 and 2A.

In an implementation relying on TIR or on a reflector like that shown at 18, light emitted by the LEDs 11 which strikes the film or the sidewall of the tube 13 reflects back into the interior of the light guide and tends to traverse the length of the light guide formed by the cylindrical section of the tube 13. If not absorbed by a phosphor particle in the material 15 contained within the tube 13, the light may reflect back from the reflector 14 on the opposite tube end and travel the length of the light guide tube again, with one or more reflections off the film or the interior tube surface. However, much of the light generated by phosphor excitations within the tubular container 13 impacts the sidewall or impacts the reflective film 18 at steeper angles, and the film and/or sidewall allows relatively uniform release along the length of the longitudinal section of the tubular lamp 10, that is to say, for output via surface 13o in the example of FIG. 1.

As outlined above, the container 13 forms a light guide with respect to at least the direct emissions of excitation energy supplied into the interior of the bulb 13 from the LEDs 11. However, the container allows emission of light generated by emissions from phosphors inside the container formed by the tubular bulb 13.

For some lighting applications where a single color is desirable rather than white, the lamp might use a single type of nanophosphor in the material 15 within the tubular container 13. For a yellow 'bug lamp' type application, for example, the one nanophosphor would be of a type that produces yellow emission in response to pumping energy from the LEDs. For a red lamp type application, as another example, the one nanophosphor would be of a type that produces predominantly red light emission in response to pumping energy from the LEDs. The upper limits of the absorption spectra of the exemplary nanophosphors are all at or around 430 nm although it is contemplated that some nanophosphors may be used with absorption or excitation spectra up to around 460 nm. Hence, the LEDs used in such a monochromatic lamp would emit energy in a wavelength range of 460 nm and below and for the specific examples at or below 430 nm. In many examples, the lamp produces white light of desirable characteristics using a number of doped semiconductor nanophosphors, and further discussion of the examples including that of FIG. 1 will concentrate on such white light implementations.

Hence for further discussion, we will assume that the container formed by the closed cylindrical bulb 13 is at least substantially filled with a liquid or gaseous material 15 bearing a number of different doped semiconductor nanophosphors dispersed in the liquid or gaseous material 15. Also, for further discussion, we will assume that the LEDs 11 are near UV emitting LEDs, such as 405 nm LEDs or other types of LEDs rated to emit somewhere in the wavelength range of 380-420 nm. Each of the doped semiconductor nanophosphors is of a type excited in response to the near UV electromagnetic energy from the LEDs 11 of the solid state sources in the exemplary lamp bases 20 at opposite ends of the tubular container 13. When so excited, each doped semiconductor nanophosphor re-emits visible light of a different spectrum. However, each such emission spectrum has substantially no overlap with absorption spectra of the doped semiconductor nanophosphors. When excited by the electromagnetic energy received from the LEDs 11, the doped semiconductor nanophosphors together produce visible white light output for the lamp 10 through the exterior surface(s) 13o of the glass bulb 13.

In the example, the liquid or gaseous material 15 with the doped semiconductor nanophosphors dispersed therein appears at least substantially clear when the lamp 10 is off, although a material with an added scattering agent may be used, in which case, the material may appear translucent when the source is off.

Further discussions of specific examples, however, will assume that the material is chosen to offer a clear appearance when the solid state sources are not exciting the phosphor(s). For example, alcohol, oils (synthetic, vegetable or other oils) or other clear liquid media may be used, or the liquid material may be a relatively clear hydrocarbon based compound or the like. Exemplary gases include hydrogen gas, clear inert gases and clear hydrocarbon based gases. The doped semiconductor nanophosphors in the specific examples described below absorb energy in the near UV and UV ranges. The upper limits of the absorption spectra of the exemplary doped nanophosphors are all at or around 430 nm, however, the exemplary nanophosphors are relatively insensitive to other ranges of visible light often found in natural or other ambient white visible light. Hence, when the lamp 10 is off, the doped semiconductor nanophosphors exhibit little or not light emissions that might otherwise be perceived as color by a human observer. Even though not emitting, the particles of the doped semiconductor nanophosphors may have some color, but due to their small size and dispersion in the material, the overall effect is that the material 15 appears at least substantially clear to the human observer, that is to say it has little or no perceptible tint.

Figure 2B:
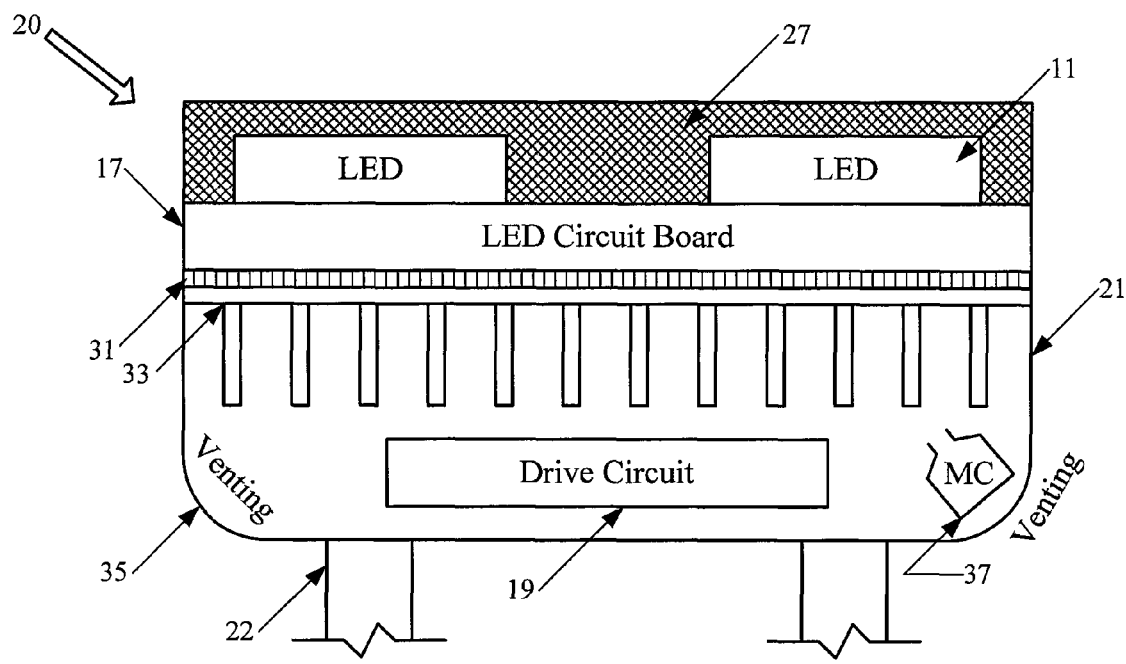
FIG. 2B is an enlarged view of a portion of the lamp illustrated in FIG. 1 showing one of the end caps and several elements that may be enclosed within the end cap.

The lamp 10 of FIG. 1 also includes at least one lamp base 20 housing LEDs 11 and mechanically one or more electrical connections. Various electrical connectors may be used to connect to an external power source, but in the example, the lamp uses bin-pin connectors similar to those found on many florescent tube lamps, represented by the pins 22 in the drawing. There could be a single lamp base 20 with a bin-pin connector or other type connector for some configurations, but in the illustrated double-ended tube arrangement, the tubular lamp 10 includes two bi-pin type lamp bases 20, with one at each of the opposite ends of the tubular light guide/container 13. FIG. 2B is an enlarged cross-sectional view of one of the lamp bases 20, showing various elements that may be included.

In the example of FIG. 2B, the LEDs 11 are mounted on a circuit board 17. Although drive from DC sources is contemplated for use in existing DC lighting systems, the examples discussed in detail utilize circuitry configured for driving the LEDs 11 in response to alternating current electricity, such as from the typical AC main lines. In a later example, some or all of the drive circuitry is in a separate housing similar to the housing of a ballast of a florescent light fixture; however, in this first example, some or all of the drive circuitry is within the housing 21 of the lamp base 20. Hence, as shown in FIG. 2B, the tube lamp also includes circuitry 19 within the lamp base 20. The circuitry may be on the same board 17 as the LEDs 11 or disposed separately within the lamp 10 and electrically connected to the LEDs 11. Electrical connections of the circuitry 19 to the LEDs and the pins 22 are omitted here for simplicity. Several examples of the drive circuitry are discussed later.

The lamp base 20 includes a housing 21 that at least encloses the circuitry 19. In the example, the housing 21 together with a face 13c of the glass container 13 also enclose the LEDs 11. The lamp base 20 mechanically supports one or more lighting industry standard lamp electrical connectors, such as the pins 22 in our example, and the pins 22 may provide electrical connections to supply alternating current electricity from AC mains to the circuitry 19 for driving the LEDs 11. The electrical connectors in the housing of lamp base 23 conform to any common standard type of lamp base for a tubular type lamp product, to permit use of the lamp 10 in a particular type of tube lamp socket or fixture. The example shows a bi-pin base, that is to say with two electrical connection pins 22 which may be the same as or similar to those used in some types of florescent tube lamps, although those skilled in the art will appreciates that other types of known or later developed tube lamp bases/connectors may be used. Also, the example shows lamp bases with LEDs, pins, etc., at both ends of the tube 13; however, for some applications, it may be convenient to provide such elements only at one end and provide a reflector or a half-mirrored reflector and a diffuser at the opposite end.

The exemplary lamp 10 of FIGS. 1 to 2B may include one or more features intended to promote optical efficiency. For example, there may be some air gap between the emitter outputs of the LEDs 11 and the facing optical coupling surface 13c of the glass bulb container 13. However, to improve out-coupling of the energy from the LEDs 11 into the light transmissive structure of the tubular container 13, it may be helpful to provide an optical grease, glue or gel 27 between the surface 13c of the tubular container 13 and the optical outputs of the LEDs 11. This index matching material 27 eliminates any air gap and provides refractive index matching relative to the material of the glass bulb container 13.

In the example, the inner surface of the end of the tubular glass bulb container 13 is reflective, due to the presence of the specular reflector 14. However, if the end of the tubular bulb was transparent, then a reflector could be provided within the lamp base 20 on the outside of the end of the tube 13. In such a case, the lamp 10 might include a specular reflector to cover parts of the surface of the circuit board 17 facing toward the input surface 13c of the bulb 13, in one or more regions between the LEDs 11.

The lamp 10 may use one, two or any number of LEDs 11 in either or both lamp bases 20 sufficient to provide a desired pumping or excitation energy to the phosphors and thus a desired output intensity for the lamp 10. The example of FIGS. 1 to 2B shows four LEDs 11, two in each lamp base 20. However, the lamp 10 may have more or less LEDs in either one or both of the lamp bases 20 than in that example.

The examples also encompass technologies to provide good heat conductivity so as to facilitate dissipation of heat generated during operation of the LEDs 11. Hence, the exemplary lamp 10 includes one or more elements forming a heat dissipater within the housing 21 of each lamp base 20 for receiving and dissipating heat produced by the LEDs 11. Active dissipation, passive dissipation or a combination thereof may be used. The lamp base 20 of FIG. 2B, for example, includes a thermal interface layer 31 abutting a surface of the circuit board 17, which conducts heat from the LEDs 11 and the board 17 to a heat sink arrangement 33 within the housing 21, shown by way of example as a plate like member having a number of fins. The housing 21 also has one or more openings or air vents 35, for allowing passage of air through the housing 21, to dissipate heat from the fins of the heat sink 33.

The thermal interface layer 31, the heat sink 33 and the vents 35 are passive elements in that they do not consume additional power as part of their respective heat dissipation functions. However, the lamp base 20 may include an active heat dissipation element that draws power to cool or otherwise dissipate heat generated by operations of the LEDs 11. Examples of active cooling elements include fans, Peltier devices or the like. The lamp 10 of FIGS. 1 to 2B utilizes one or more membronic cooling (MC) elements. A membronic cooling element comprises a membrane that vibrates in response to electrical power to produce an airflow. An example of a membronic cooling element is a SynJet® sold by Nuventix. In the example of FIG. 2B, the membronic cooling element MC 37 operates like a fan or air jet for circulating air across the heat sink 33 and through the air vents 35.

The exemplary tubular lamp 10 emits light from the semiconductor nanophosphor excitation radially from the cylindrical output surface 13c of the longitudinal section of the tubular container 13. In the orientation illustrated in FIG. 1, white light is dispersed upwards and downwards or out in all directions from the lateral cross section of FIG. 2A. Although not shown in the drawings for this first example, other optical elements may be provided to direct light in a desired direction or pattern, such as reflectors, diffusers and the like, commonly found in fixtures or luminaries designed for use with tubular lamps. The orientation shown, however, is purely illustrative. The lamp 10 may be oriented in any direction appropriate for the desired lighting application.

The example assumes a straight tube implementation, with the longitudinal main central section or "tubular portion" of the container 13 having cylindrical internal and external surfaces. Those skilled in the art will recognize, however, that other tubular shapes may be used. The lateral cross-section, for example, could be oblong, rectangular, square or triangular, etc., instead of circular as shown in FIG. 2B. Also, the tube 13 may be curved or bent along its length. Furthermore, the inner and outer surfaces of the tube may converge or diverge somewhat, either laterally or longitudinally.

As outlined above, the one or more semiconductor nanophosphors dispersed in the material shown at 15 are of types or configurations (e.g. selected types of doped semiconductor nanophosphors) excitable by the relevant spectrum of energy from the solid state source 11. In the present example, the nanophosphor(s) may have absorption spectra that include some or all of the near UV range, in particular the 405 nm emission spectrum of the exemplary LED source 11, although the absorption spectra may extend down into the UV range. When excited by electromagnetic energy in the absorption spectrum from the solid state source, each semiconductor nanophosphor emits visible light in a characteristic emission spectrum that is separated from the absorption spectra of the nanophosphors, for inclusion in a light output for the fixture.

The upper limits of the absorption spectra of the exemplary nanophosphors are all at or below 460 nm, for example, around 430 nm. However, the exemplary nanophosphors are relatively insensitive to other ranges of visible light often found in natural or other ambient white visible light. Hence, when the tubular lamp 10 is off, the semiconductor nanophosphors will exhibit little or not light emissions that might otherwise be perceived as color by a human observer. Even though not emitting, the particles of the doped semiconductor nanophosphor may have some color, but due to their small size and dispersion in the material, the overall effect is that the material and nanophosphor material 15 appears at least substantially clear to the human observer, that is to say it has little or no perceptible tint. If the material includes a scattering agent, the material with the nanophosphors may appear translucent, e.g. white, when the sources are off.

As noted, one or two of the nanophosphors may be used in the material at 15 to produce a relatively mono-chromatic light output or a light output that appears somewhat less than full white to a person. However, in many commercial examples for general lighting or the like, the fixture produces white light of desirable characteristics using a number of semiconductor nanophosphors, and further discussion of the examples including that of FIGS. 1 to 2B will concentrate on such white light implementations.

Hence for further discussion of this example, we will assume that the container 14 is filled with a liquid or gaseous material 15 bearing a number of different semiconductor nanophosphors dispersed in the material for together producing a high quality white output light. Also, for further discussion, we will assume that each solid state source 11 is a near UV emitting LED, such as 405 nm LEDs or other type of LED rated to emit somewhere in the wavelength range of 380-420 nm. Although other types of semiconductor nanophosphors are contemplated, we will also assume that each nanophosphor is a doped semiconductor of a type excited in response to near UV electromagnetic energy from the LEDs 11 of the solid state source.

When so excited, each doped semiconductor nanophosphor in the white light type tubular lamp 11 re-emits visible light of a different spectrum. However, each such emission spectrum has substantially no overlap with absorption spectra of the doped semiconductor nanophosphors. When excited by the electromagnetic energy received from the LEDs 11, the doped semiconductor nanophosphors together produce visible light output for the lamp of a desired characteristic, through the exterior surface(s) of the container 13o.

In an example of a white light type the tubular lamp 10, the excited nanophosphors together produce output light that is at least substantially white and has a color rendering index (CRI) of 75 or higher. The lamp output light produced by this excitation of the semiconductor nanophosphors exhibits color temperature in one of several desired ranges along the black body curve. Different lamps 10 designed for different color temperatures of white output light would use different formulations of mixtures of doped semiconductor nanophosphors. The white output light of the lamp 10 exhibits color temperature in one of four specific ranges along the black body curve listed in Table 1 below.

TABLE 1

Nominal Color Temperatures and Corresponding Color Temperature Ranges

| Nominal Color Temp. (° Kelvin) | Color Temp. Range (° Kelvin) |
|---|---|
| 2700 | 2725 ± 145 |
| 3000 | 3045 ± 175 |
| 3500 | 3465 ± 245 |
| 4000 | 3985 ± 275 |

Figure 3:
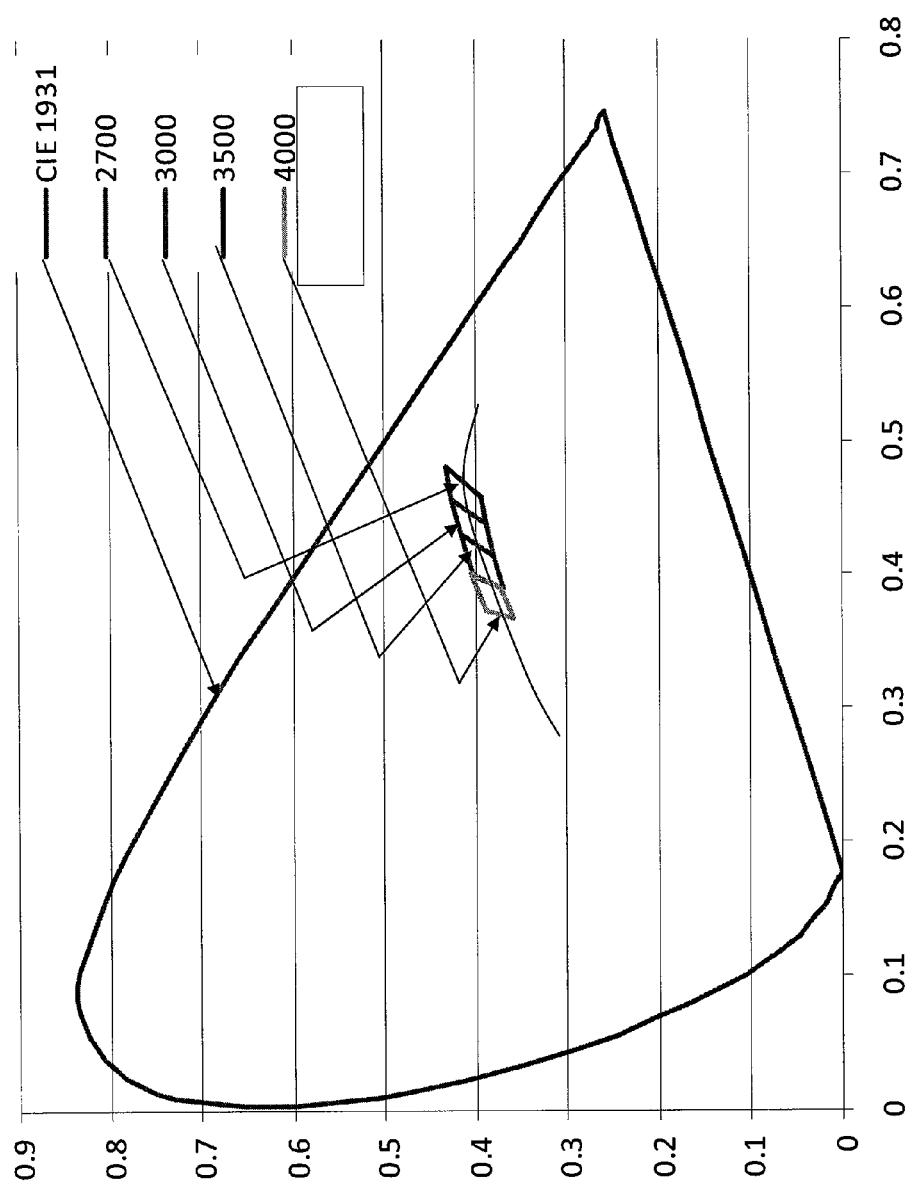
FIG. 3 is a color chart showing the black body curve and tolerance quadrangles along that curve for chromaticities corresponding to several desired color temperature ranges for tube type lamps configured for white light applications.

In Table 1, each nominal color temperature value represents the rated or advertised temperature as would apply to particular lamp products having an output color temperature within the corresponding range. The color temperature ranges fall along the black body curve. FIG. 3 shows the outline of the CIE 1931 color chart, and the curve across a portion of the chart represents a section of the black body curve that includes the desired CIE color temperature (CCT) ranges. The light may also vary somewhat in terms of chromaticity from the coordinates on the black body curve. The quadrangles shown in the drawing represent the respective ranges of chromaticity for the nominal CCT values. Each quadrangle is defined by the range of CCT and the distance from the black body curve. Table 2 below provides chromaticity specifications for the four color temperature ranges. The x, y coordinates define the center points on the black body curve and the vertices of the tolerance quadrangles diagrammatically illustrated in the color chart of FIG. 3.

TABLE 2

Chromaticity Specification for the Four Nominal Values/CCT Ranges

| | CCT Range | | | | | | | |
|---|---|---|---|---|---|---|---|---|
| | 2725 ± 145 | | 3045 ± 175 | | 3465 ± 245 | | 3985 ± 275 | |
| | Nominal CCT | | | | | | | |
| | 2700° K | | 3000° K | | 3500° K | | 4000° K | |
| | x | y | x | y | x | y | x | y |
| Center point | 0.4578 | 0.4101 | 0.4338 | 0.4030 | 0.4073 | 0.3917 | 0.3818 | 0.3797 |
| Tolerance Quadrangle | 0.4813 | 0.4319 | 0.4562 | 0.4260 | 0.4299 | 0.4165 | 0.4006 | 0.4044 |
| | 0.4562 | 0.426 | 0.4299 | 0.4165 | 0.3996 | 0.4015 | 0.3736 | 0.3874 |
| | 0.4373 | 0.3893 | 0.4147 | 0.3814 | 0.3889 | 0.369 | 0.367 | 0.3578 |
| | 0.4593 | 0.3944 | 0.4373 | 0.3893 | 0.4147 | 0.3814 | 0.3898 | 0.3716 |

The solid state tube lamp 10 could use a variety of different combinations of semiconductor nanophosphors to produce such an output. Examples of suitable doped type semiconductor nanophosphors are available from NN Labs of Fayetteville, Ark. In a specific example, one or more of the doped semiconductor nanophosphors comprise zinc selenide quantum dots doped with manganese or copper. The selection of one or more such nanophosphors excited mainly by the low end (460 nm or below) of the visible spectrum and/or by UV energy together with dispersion of the nanophosphors in an otherwise clear material minimizes any potential for discolorization of the lamp 10 when the lamp in its off-state that might otherwise be caused by the presence of a phosphor material.

Figure 4:
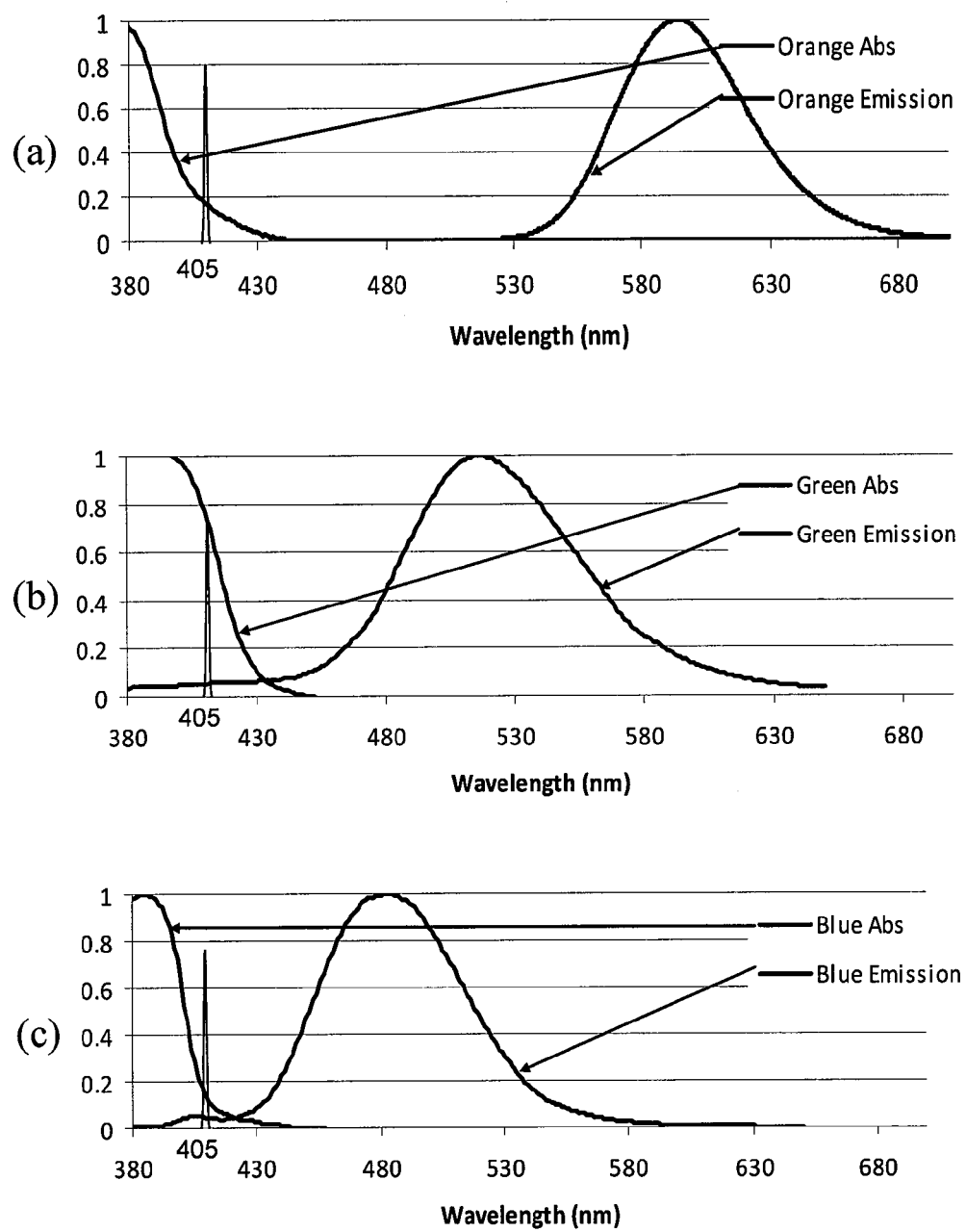
FIG. 4 is a graph of absorption and emission spectra of a number of doped type semiconductor nanophosphors.

Doped semiconductor nanophosphors exhibit a large Stokes shift, that is to say from a short-wavelength range of absorbed energy up to a fairly well separated longer-wavelength range of emitted light. FIG. 4 shows the absorption and emission spectra of three examples of doped semiconductor nanophosphors. Each line of the graph also includes an approximation of the emission spectra of the 405 nm LED chip, to help illustrate the relationship of the 405 nm LED emissions to the absorption spectra of the exemplary doped semiconductor nanophosphors. The illustrated spectra are not drawn precisely to scale but in a manner to provide a teaching example to illuminate our discussion here.

The top line (a) of the graph shows the absorption and emission spectra for an orange emitting doped semiconductor nanophosphor. The absorption spectrum for this first phosphor includes the 380-420 nm near UV range, but that absorption spectrum drops substantially to 0 (has an upper limit) somewhere around or a bit below 450 nm. As noted, the phosphor exhibits a large Stokes shift from the short wavelength(s) of absorbed light to the longer wavelengths of re-emitted light. The emission spectrum of this first phosphor has a fairly broad peak in the wavelength region humans perceive as orange. Of note, the emission spectrum of this first phosphor is well above the illustrated absorption spectra of the other doped semiconductor nanophosphors and well above its own absorption spectrum. As a result, orange emissions from the first doped semiconductor nanophosphor would not re-excite that phosphor and would not excite the other doped semiconductor nanophosphors if mixed together. Stated another way, the orange phosphor emissions would be subject to little or no phosphor re-absorption, even in mixtures containing one or more of the other doped semiconductor nanophosphors.

The next line (b) of the graph in FIG. 4 shows the absorption and emission spectra for a green emitting doped semiconductor nanophosphor. The absorption spectrum for this second phosphor includes the 380-420 nm near UV range, but that absorption spectrum drops substantially to 0 (has an upper limit) about 450 or 460 nm. This phosphor also exhibits a large Stokes shift from the short wavelength(s) of absorbed light to the longer wavelengths of re-emitted light. The emission spectrum of this second phosphor has a broad peak in the wavelength region humans perceive as green. Again, the emission spectrum of the phosphor is well above the illustrated absorption spectra of the other doped semiconductor nanophosphors and well above its own absorption spectrum. As a result, green emissions from the second doped semiconductor nanophosphor would not re-excite that phosphor and would not excite the other doped semiconductor nanophosphors if mixed together. Stated another way, the green phosphor emissions also should be subject to little or no phosphor re-absorption, even in mixtures containing one or more of the other doped semiconductor nanophosphors.

The bottom line (c) of the graph shows the absorption and emission spectra for a blue emitting doped semiconductor nanophosphor. The absorption spectrum for this third phosphor includes the 380-420 nm near UV range, but that absorption spectrum drops substantially to 0 (has an upper limit) about 450 or 460 nm. This phosphor also exhibits a large Stokes shift from the short wavelength(s) of absorbed light to the longer wavelengths of re-emitted light. The emission spectrum of this third phosphor has a broad peak in the wavelength region humans perceive as blue. The main peak of the emission spectrum of the phosphor is well above the illustrated absorption spectra of the other doped semiconductor nanophosphors and well above its own absorption spectrum. In the case of the blue example, there is just a small amount of emissions in the region of the phosphor absorption spectra. As a result, blue emissions from the third doped semiconductor nanophosphor would re-excite that phosphor at most a minimal amount. As in the other phosphor examples of FIG. 4, the blue phosphor emissions would be subject to relatively little phosphor re-absorption, even in mixtures containing one or more of the other doped semiconductor nanophosphors.

Examples of suitable orange, green and blue emitting doped semiconductor nanophosphors of the types generally described above relative to FIG. 4 are available from NN Labs of Fayetteville, Ark.

As explained above, the large Stokes shift results in negligible re-absorption of the visible light emitted by doped semiconductor nanophosphors. This allows the stacking of multiple phosphors. It becomes practical to select and mix two, three or more such phosphors in a manner that produces a particular desired spectral characteristic in the combined light output generated by the phosphor emissions.

Figure 5A:
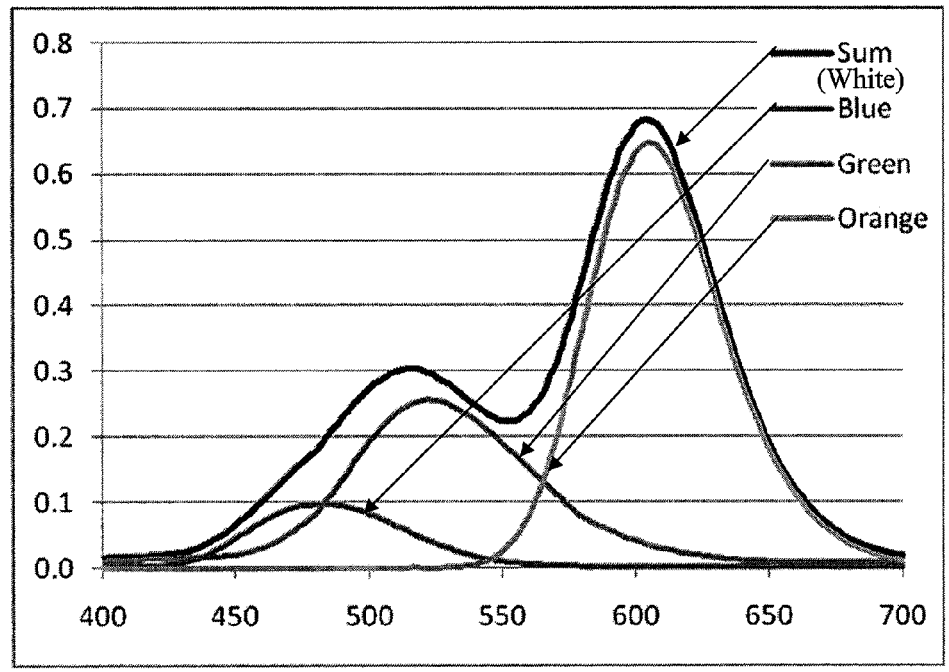
FIG. 5A is a graph of emission spectra of three of the doped semiconductor nanophosphors selected for use in an exemplary solid state light emitting lamp as well as the spectrum of the white light produced by combining the spectral emissions from those three phosphors.

FIG. 5A graphically depicts emission spectra of three of the doped semiconductor nanophosphors selected for use in an exemplary solid state light fixture as well as the spectrum of the white light produced by summing or combining the spectral emissions from those three phosphors. For convenience, the emission spectrum of the LED has been omitted from FIG. 5A, on the assumption that a high percentage of the 405 nm light from the LED is absorbed by the phosphors. Although the actual output emissions from the fixture may include some near UV light from the LED, the contribution thereof if any to the sum in the output spectrum should be relatively small.

Although other combinations are possible based on the nanophosphors discussed above relative to FIG. 4 or based on other semiconductor nanophosphor materials, the example of FIG. 5A represents emissions of blue, green and orange phosphors. The emission spectra of the blue, green and orange emitting doped semiconductor nanophosphors are similar to those of the corresponding color emissions shown in FIG. 4. Light is additive. Where the solid state lamp 10 includes the blue, green and orange emitting doped semiconductor nanophosphors as shown for example at 15 in FIG. 1, the addition of the blue, green and orange emissions produces a combined spectrum as approximated by the top or 'Sum' curve in the graph of FIG. 5A.

Various mixtures of doped semiconductor nanophosphors will produce white light emissions from a lamp 10 that exhibit CRI of 75 or higher. For an intended lamp specification, a particular mixture of phosphors is chosen so that the light output of the fixture exhibits color temperature in one of the following specific ranges along the black body curve: 2,725±145° Kelvin; 3,045±175° Kelvin; 3,465±245° Kelvin; and 3,985±275° Kelvin. In the example shown in FIG. 5A, the 'Sum' curve in the graph produced by the mixture of blue, green and orange emitting doped semiconductor nanophosphors would result in a white light output having a color temperature of 2800° Kelvin (within the 2,725±145° Kelvin range). That white output light also would have a CRI of 80 (higher than 75).

It is possible to add one or more additional nanophosphors, e.g. a fourth, fifth, etc., to the mixture to further improve the CRI. For example, to improve the CRI of the nanophosphor mix of FIGS. 4 and 5A, a doped semiconductor nanophosphor might be added to the mix with a broad emissions spectrum that is yellowish-green or greenish-yellow, that is to say with a peak of the phosphor emissions somewhere in the range of 540-570 nm, say at 555 nm.

Other mixtures also are possible, with two, three or more doped semiconductor nanophosphors. The example of FIG. 5B uses red, green and blue emitting semiconductor nanophosphors, as well as a yellow fourth doped semiconductor nanophosphor. Although not shown, the absorption spectra would be similar to those of the three nanophosphors discussed above relative to FIG. 4. For example, each absorption spectrum would include at least a portion of the 380-420 nm near UV range. All four phosphors would exhibit a large Stokes shift from the short wavelength(s) of absorbed light to the longer wavelengths of re-emitted light, and thus their emissions spectra have little or not overlap with the absorption spectra.

In this example (FIG. 5B), the blue nanophosphor exhibits an emission peak at or around 484, nm, the green nanophosphor exhibits an emission peak at or around 516 nm, the yellow nanophosphor exhibits an emission peak at or around 580, and the red nanophosphor exhibits an emission peak at or around 610 nm. The addition of these blue, green, red and yellow phosphor emissions produces a combined spectrum as approximated by the top or 'Sum' curve in the graph of FIG. 4B. The 'Sum' curve in the graph represents a resultant white light output having a color temperature of 2600° Kelvin (within the 2,725±145° Kelvin range), where that white output light also would have a CRI of 88 (higher than 75).

Figure 5B:
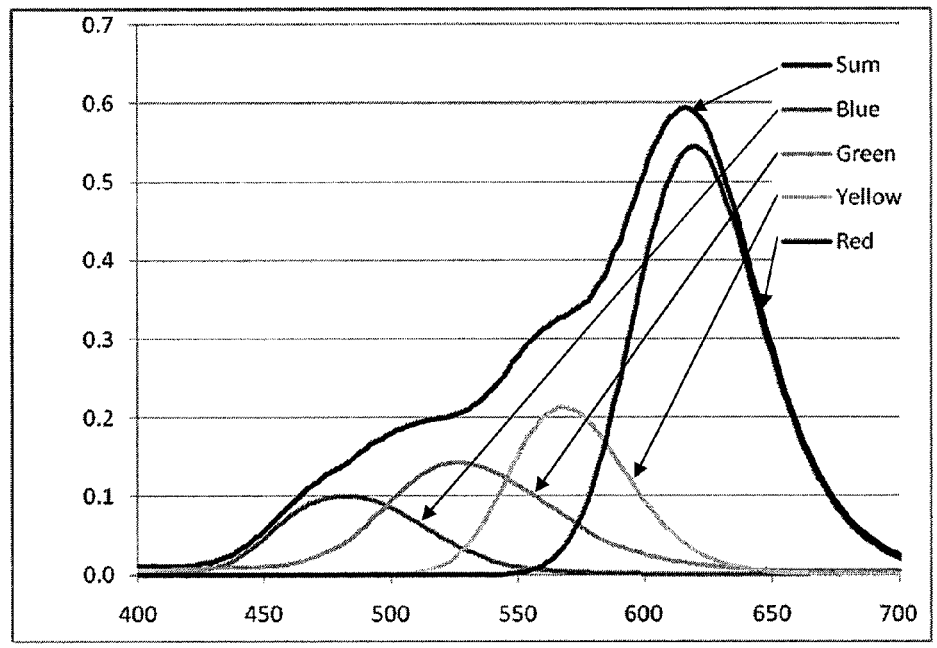
FIG. 5B is a graph of emission spectra of four doped semiconductor nanophosphors, in this case, for red, green, blue and yellow emissions, as well as the spectrum of the white light produced by combining the spectral emissions from those four phosphors.

As shown by the examples of FIGS. 4-5B, the emission spectra of the various exemplary nanophosphors are substantially broader than the relatively monochromatic emission spectra of the LEDs. As shown by the graphs in FIGS. 5A and 5B, the emission spectra of some of the nanophosphors overlap, although the emissions peaks are separate. Such spectra represent pastel colors of relatively low purity levels. However, when added together, these emission spectra tend to fill-in gaps somewhat, so that there may be peaks but not individual spikes in the spectrum of the resultant combined output light. Stated another way, the visible output light tends to be at least substantially white of a high quality when observed by a person. Although not precisely white in the electromagnetic sense, the light formed by combining or summing the emissions from the phosphors may approach a spectrum corresponding to that of a black body. Of the two examples, the 'sum' curve for the white light in the example of FIG. 5B comes closer to the spectrum of light corresponding to a point on the black body curve over a wavelength range from about 425 nm to about 630 nm, although the peak in the example somewhat exceeds the black body spectrum and the exemplary sum spectrum falls off somewhat faster after that peak.

Returning to FIG. 1, assume that the phosphors in the material at 15 in the tube lamp 10 include the blue, green and orange emitting doped semiconductor nanophosphors discussed above relative to FIGS. 4 and 5A. As discussed earlier, each LED 11 is rated to emit near UV electromagnetic energy of a wavelength in the range of ≤460 nm, such as 405 nm in the illustrated example, which is within the excitation or absorption spectrum of each of the three included phosphors in the mixture shown at 15. With respect to most emissions from the LEDs 11, the interior of the tubular container 13 provides internal reflection so that the tube forms a light guide causing that light to traverse the longitudinal section of the container 13 and pass through the medium 15 one or more times and excite the nanophosphors dispersed in the medium. When so excited, the combination of doped semiconductor nanophosphors in the material 15 re-emits the various wavelengths of visible light represented by the blue, green and orange lines in the graph of FIG. 5A. Combination or addition thereof in the lamp output through surface 13o produces "white" light, which for purposes of our discussion herein is light that is at least substantially white light. The white light emission from the solid state lamp 10 exhibits a CRI of 75 or higher (80 in the specific example of FIG. 4A). Also, the light output of the lamp 10 exhibits color temperature of 2800° Kelvin, that is to say within the 2,725±145° Kelvin range. Other combinations of doped semiconductor nanophosphors can be used in a solid state lamp 10 to produce the high CRI white light in the 3,045±175° Kelvin, 3,465±245° Kelvin, and 3,985±275° Kelvin ranges.

This lamp 10 provides a "remote" implementation of the semiconductor nanophosphors in that the semiconductor nanophosphors are outside of the package enclosing the actual semiconductor chip or chips and thus are apart or remote from the semiconductor chip(s). The remote semiconductor nanophosphors may be provided in or about the tube of the lamp in any of a number of different ways, such as along any suitable portion of the inner reflective surface of the tube 13. However, in the example, the material bearing the nanophosphors is within the container formed by the tube and fills the interior volume of the container at least to a substantial degree.

The various lamps shown and discussed in the examples are adaptable to a variety of standard lamp sockets and attendant switch and/or dimming configurations. For these different lamp applications, the lamps may incorporate somewhat different forms of the drive circuitry 19, or as discussed by way of later examples, may connect to separate drive circuitry. It may be helpful to consider a few different examples of appropriate circuitry, initially, circuitry for possible inclusion within the end cap 20. As in the example of FIG. 1, we will assume a tube configuration with two connection pins as part of a lamp base at each end of the tube 13. Although the LEDs 11 and associated circuitry could be different at both ends, for some applications, we will assume the use of the same types and the same number of LEDs and thus essentially the same drive circuitry, in both lamp bases.

Figure 6:
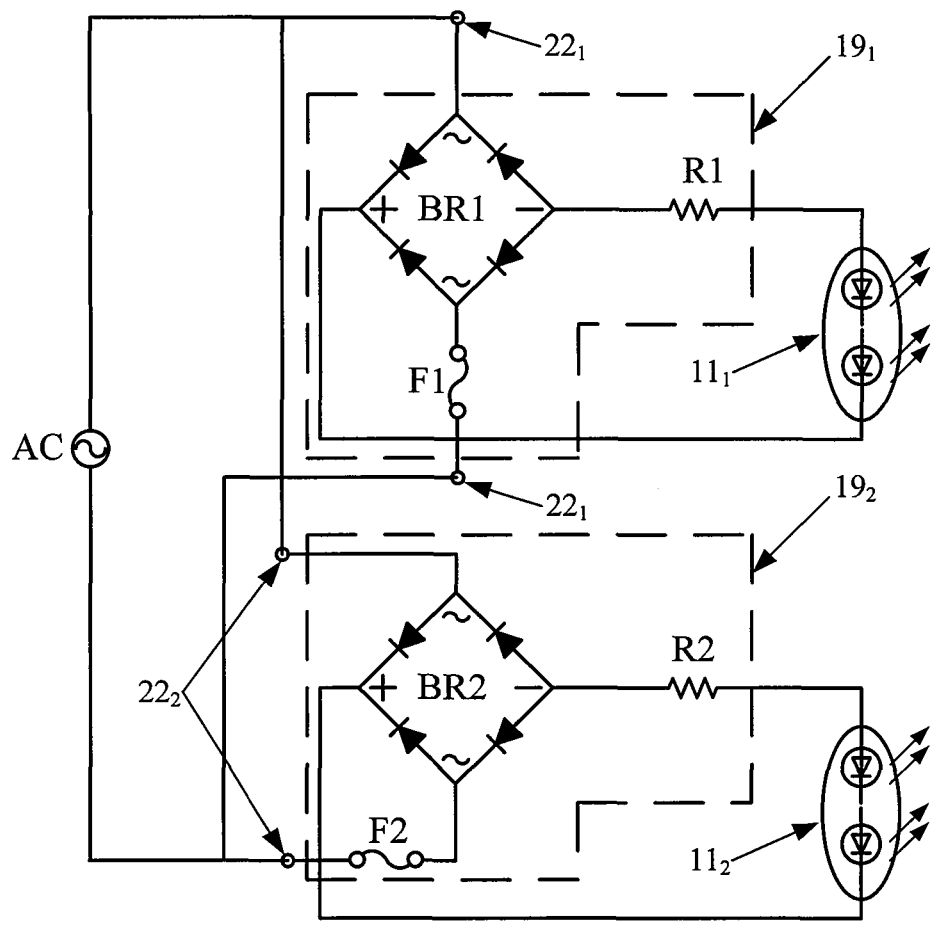
FIG. 6 is an example of the LED and drive circuitry, for driving two strings of LEDs, as might be used in the lamp of FIG. 1, to drive the lamp from AC line current (rectified in this example, but not converted to DC).

Depending on the type of LEDs selected for use in a particular lamp product design, the LEDs may be driven by AC current, typically rectified; or the LEDs may be driven by a DC current after rectification and regulation. FIG. 6 is an example of the LED and drive circuitry, for driving a string of LEDs from AC line current (rectified in this example, but not converted to DC). Such an implementation may use high voltage LEDs, such as the Seoul A4 LEDs.

In this example, the fixture (not shown) would provide connections of the pins $22_1$ for one lamp base and pins $22_2$ for the other lamp base across the AC line. In one base, one of the pins $22_1$ connects AC electricity to one node of a four diode bridge rectifier BR1, and the other pin $22_1$ connects AC electricity to the other side of the AC line to the opposite node of the bridge rectifier BR2 through a protection fuse F1. The other two nodes of the bridge rectifier BR2 provide rectified AC current to one or more LEDs forming series connected string $11_1$ in the first lamp base. A resistor R1 between one bridge node and the LED string $11_1$ limits the current to a level appropriate to the power capacity of the particular LED string. In this example, the fuse F1, the bridge rectifier BR1 and the resistor R1 form the drive circuit $19_1$ for driving the LEDs $11_1$ in the particular lamp base.

Similarly, in the other lamp base, one of the pins $22_2$ connects AC electricity to one node of a four diode bridge rectifier BR2, and the other pin $22_2$ connects AC electricity to the other side of the AC line to the opposite node of the bridge rectifier BR2 through a protection fuse F2. The other two nodes of the bridge rectifier BR2 provide rectified AC current to one or more LEDs forming series connected string $11_2$ in the second end cap. A resistor R2 between one bridge node and the LED string $11_2$ limits the current to a level appropriate to the power capacity of the particular LED string. In this example, the fuse F2, the bridge rectifier BR2 and the resistor R2 form the drive circuit $19_2$ for driving the LEDs $11_2$ in the particular lamp base.

In the earlier example, the drive circuit was implemented in the lamp bases at the ends of the tube. However, for at least some applications, it may be more convenient to deploy some or all of the drive circuit in a separate housing. The tubular lamp may be configured as a replacement for florescent lamp tubes. Many florescent lamps are driven from a separate ballast, and lighting designers and end users already familiar with such tube lamps accept the presence of a ballast as a separate system or fixture component. Hence, use of a similar housing as a component of a solid state tube lamp fixture or system should be commercially acceptable. The separate ballast-like housing in turn offers a location for drive circuitry that can be more complex and can then offer more sophisticated features. It may be helpful to consider some examples of such an arrangement and the circuitry that may be included in the housing.

Figure 7:
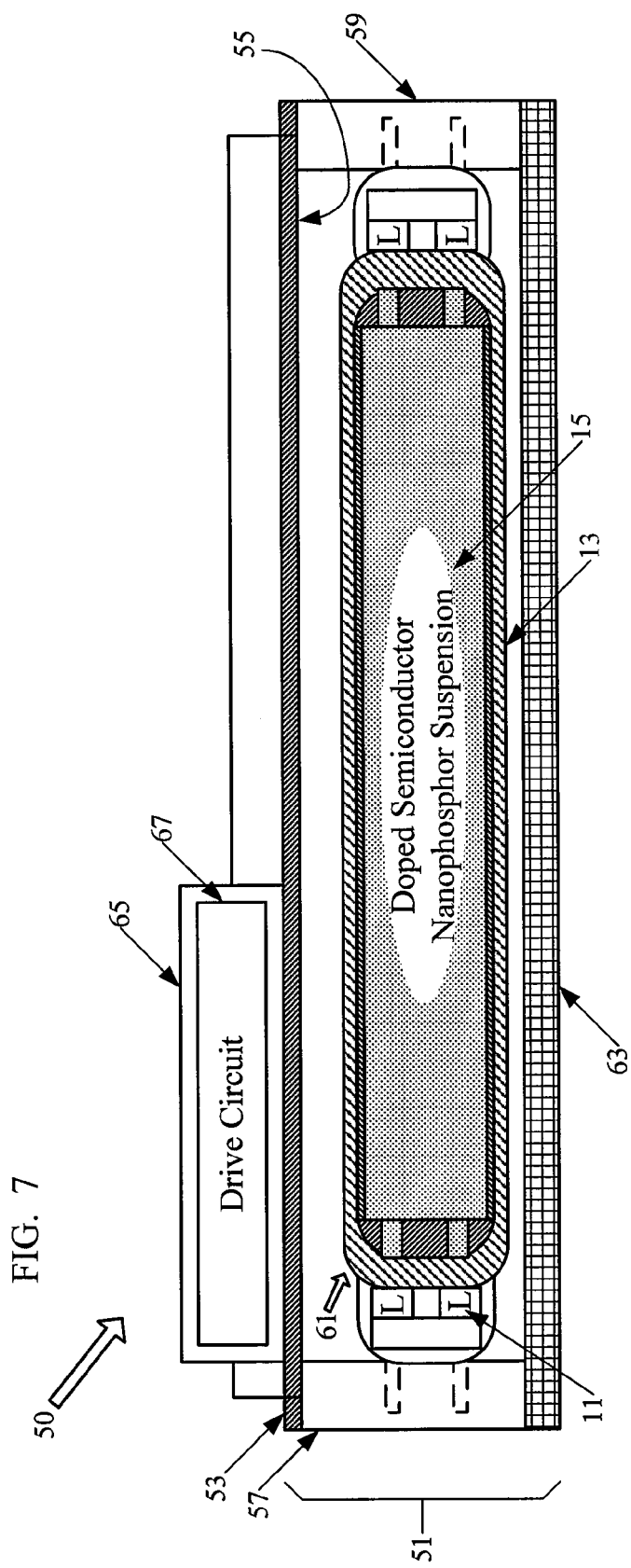
FIG. 7 illustrates an example of a lighting system comprising a fixture that incorporates a tubular lamp similar to that of FIG. 1 but with external drive circuitry in a housing, for example, similar to the housing for a ballast of a florescent lamp.

FIG. 7 shows an example of a solid state lighting system 50, using a tubular lamp of the type discussed herein, in a fixture 51. The fixture includes a housing 53, which has a reflective inner surface 55 (or supports a reflector). The reflective surface may be specular or semi-specular, or the reflective surface may be diffusely reflective. A variety of reflector shapes are possible. The housing 53 includes or connects to two end brackets 57 and 59, which include sockets for receiving the pins of a solid state tube lamp 61. The sockets provide mechanical support as well as electrical connections to the pins of the tube lamp 61. The tube lamp 61 is similar to the lamp of FIG. 1, in that it includes LEDs 11 and a tubular container 13 with internal reflectors and containing a nanophosphor bearing material 15. The lamp 61 differs in that the drive circuit is not included within the lamp bases as in the earlier example.

In the example of FIG. 7, the fixture 51 includes a single solid state tubular lamp 61. Those skilled in the art will recognize of course that fixtures may be designed to utilize more tubes, much as florescent fixtures may use one or more florescent tubes.

The fixture 51 may include a grating or diffuser 63, or other element to process the light output from the lamp 61, and to give the fixture a desired appearance when observed from the area illuminated by the fixture. The fixture 51 is shown in an orientation for projecting the light output downward in the drawing. However, this orientation is illustrative only, and those skilled in the art will appreciate that the fixture 51 may be configured or oriented to emit the output light in any direction desired for a particular lighting application.

The material 15 includes one or more nanophosphors as discussed above relative to earlier examples. For discussion purposes here, we will assume that the system 50 is intended for a general white lighting application. Hence, for purposes of further discussion, we will assume that the material 15 includes three or more of the doped semiconductor nanophosphors selected and mixed to produce white light of a high CRI and of a color temperature in one of the ranges discussed earlier relative to Tables 1 and 2. As a result, the LEDs 11 may be driven to supply energy to the interior volume of the container/light guide 13, which excites the nanophosphors in the material 15 to produce white light for output from the lamp and thus from the fixture 51.

The fixture 51 includes or connects to a housing 65 that may appear similar to the ballast of a florescent light fixture, although other shapes may be used. Of note for purposes of this discussion, the housing 65 contains the drive circuit 67 of the system 50. As shown, each end of the tube 61 fits into a respective one of two light tube sockets, for example, formed within the respective support brackets 57, 59 of the fixture 51. Each light tube socket has female electrical connectors. Each end of the tube 61 has a standard tube end cap or lamp base, in this example, a bi-pin base much like in the earlier example, which means that each base includes the two male pins intended to mate into the female electrical connectors of the respective light tube socket of the fixture 51. The fixture 51 will also have electrical connections of the sockets in the support brackets 57, 59 with the drive circuit 67 in the housing 65. The drive circuit 67 could be similar to the circuits $19_1$ and $19_2$ of FIG. 6, although the housing 65 offers space to deploy a wide range of other more complex/sophisticated type of drive circuits.

Figure 8:
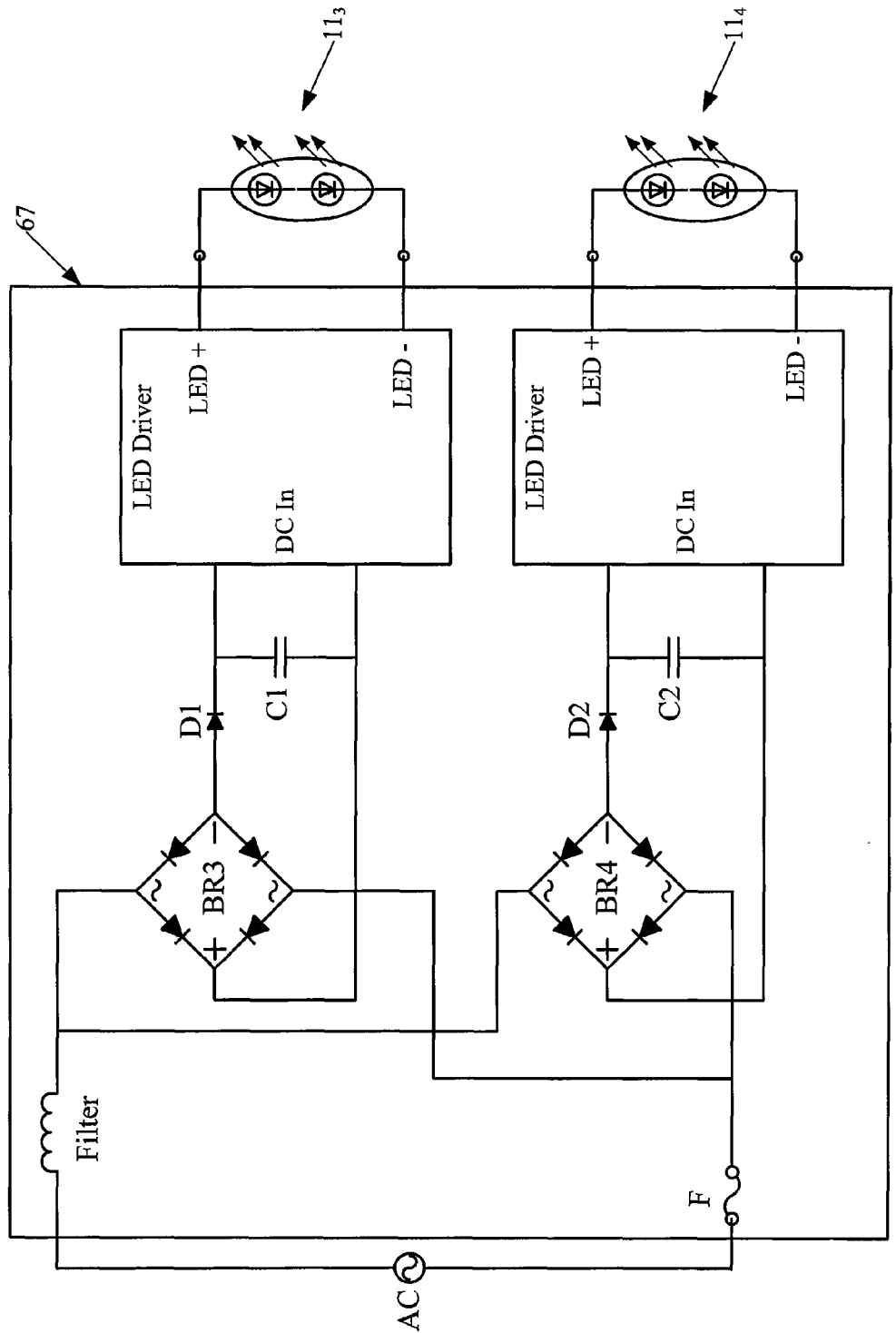
FIG. 8 is an example of the LED and drive circuitry, in which a LED driver converts AC to DC to drive the LEDs, as might be used in the lighting system of FIG. 7.

FIG. 8 is an example of the LEDs and a drive circuit 67, for driving two strings of LEDs $11_3$ and $11_4$, in which two LED drivers convert AC to DC to drive the LEDs. In the circuitry 67 of FIG. 8, the fixture or system connects AC electricity across two nodes of each of two four diode bridge rectifiers BR3 and BR4. One connection is through a fuse F, and the other connection is through a filter shown by way of an exemplary inductor.

The other two nodes of the bridge rectifier BR3 provide rectified AC current to a diode and capacitor circuit (D1, C1) which regulate the current to provide DC to a first of two LED driver circuits. In a similar fashion, the other two nodes of the bridge rectifier BR4 provide rectified AC current to a diode and capacitor circuit (D2, C2) which regulate the current to provide DC to the second of the LED driver circuits. Each LED driver adjusts the DC current to the level appropriate to power the respective string of LEDs $11_3$ or $11_4$. A variety of LED drivers of the type generally represented in block diagram form in FIG. 12 are available on the market and suitable for use with lamps of the type under discussion here. The fixture (51 in FIG. 7) would provide connections of the pins for each lamp base from the respective socket to the regulated DC current output of the respective LED driver circuits.

The example of FIG. 8 utilized two relatively simple LED driver circuits. Simpler versions are possible, for example, using a single rectifier bride and/or a single LED driver circuit. However, the use of the housing to contain the driver circuit and the fixture to provide the connections from the circuits to the pins of the lamp (and thus to the LEDs) also allows use of any of a variety of more complex driver circuit arrangements, for example, to offer one or more types of control of the lamp operations.

For many white light applications, the control circuitry may offer relatively simple user control, e.g. just ON/OFF or possibly with some rudimentary dimmer functionality. For example, in a general lighting application, a triac dimmable driver may be used to provide DC drive current from an AC power source. Such a driver offers ON/OFF control as well as level setting control responsive to triac variations of the AC waveform from a standard type dimmer unit.

Figure 9:
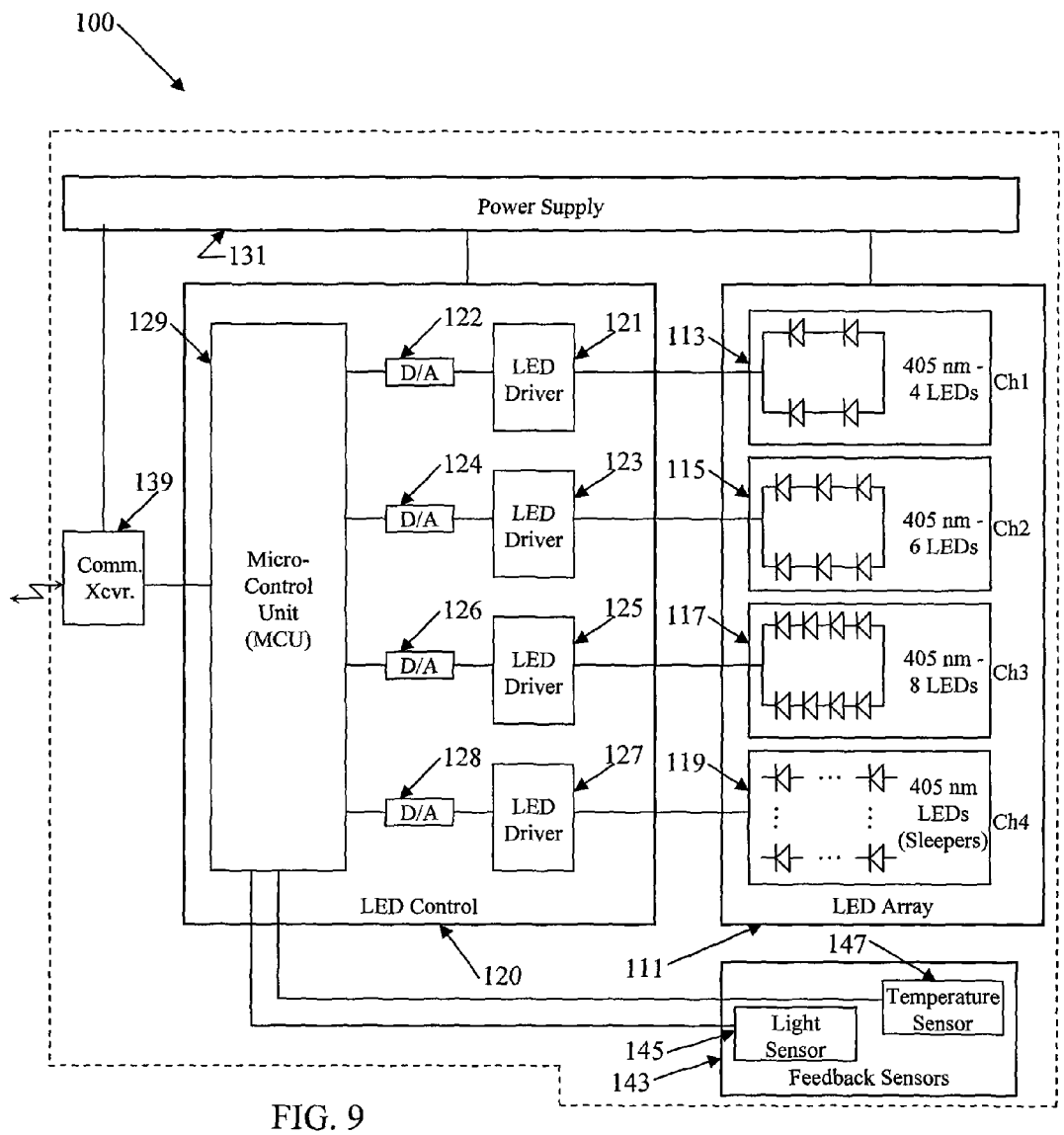
FIG. 9 is a functional block type circuit diagram, of another implementation of the drive circuitry and LEDs, for a system like that of FIG. 7, which may also offer more complex control such as dimming.

However, for completeness, we will discuss an example of suitable circuitry, offering relatively sophisticated control capabilities, with reference to FIG. 9. Aside from the LEDs, most or all of the circuitry of FIG. 9 could be housed in the housing 65, in the system 50 of FIG. 7, although somewhat different connections than just the bi-pins might be used to provide connections to various subsets of the LEDs in the respective lamp bases. FIG. 9 is a block diagram of an exemplary solid state lighting system 100, including the control circuitry and the LED type sold state light sources, for a white light application, such as an implementation of the system of FIG. 7, using 405 nm LEDs as the LEDs 11 of that earlier example. The circuitry of FIG. 9 provides digital programmable control of the light.

In the lighting system 100 of FIG. 9, the set of solid state sources takes the form of a LED array 111. In a system like that of FIG. 7, the LEDs of the array 111 would correspond to the LEDs 11 in the lamp bases of the tubular lamp 61. A circuit similar to that of FIG. 9 has been used in the past, for example, for RGB type lighting (see e.g. U.S. Pat. No. 6,995,355). The same circuit is being used here with LEDs of a single wavelength rating λ of emission chosen to fall within the absorption spectra of the selected nanophosphors dispersed in the material at 15. Although the circuit elements are similar to those of the earlier RGB system, the system 100 here uses different programming, to provide step-wise intensity control in a white lighting system having a substantial number of LEDs.

As noted, for discussion purposes, the array 111 in the example comprises one or more 405 nm LEDs. The LEDs in the array 111 are arranged in each of four different strings forming lighting channels Ch1 to Ch4. Here, the array 111 includes three initially active strings of LEDs, represented by LED blocks 113, 115 and 117. The strings may have the same number of one or more LEDs, or the strings may have various combinations of different numbers of one or more LEDs. For purposes of discussion, we will assume that the first block or string of LEDs 113 comprises 4 LEDs. The LEDs may be connected in series, but in the example, two sets of 2 series connected LEDs are connected in parallel to form the block or string of 4 405 nm near UV LEDs 113, with 2 of those LEDs in each of the two bases of the lamp. The LEDs may be considered as a first channel Ch1, for control purposes discussed more later.

In a similar fashion, the second block or string of LEDs 115 comprises 6 405 nm LEDs. The 6 LEDs may be connected in series, but in the example, two sets of 3 series connected LEDs are connected in parallel to form the block or string of 6 405 nm near UV LEDs 115, with 3 of those LEDs in each of the two lamp bases. The third block or string of LEDs 117 comprises 8 LEDs. The 8 LEDs may be connected in series, but in the example, two sets of 4 series connected LEDs are connected in parallel to form the block or string of 8 405 nm near UV LEDs 117, with 4 of those LEDs in each of the two lamp bases. The LEDs 115 may be considered as a second channel Ch2, whereas the LEDs 117 may be considered as a third channel Ch3 for control purposes discussed more later.

The LED array 111 in this example also includes a number of additional or 'other' LEDs 119. Some implementations may include various color LEDs, such as specific primary color LEDs, IR LEDs or UV LEDs, for various ancillary purposes. Another approach might use the LEDs 119 for a fourth channel of 405 nm LEDs to further control intensity in a step-wise manner. In the example, however, the additional LEDs 119 are 'sleepers.' Initially, the LEDs 113-117 would be generally active and operate in the normal range of intensity settings, whereas sleepers 119 initially would be inactive. Inactive LEDs are activated when needed, typically in response to feedback indicating a need for increased output (e.g. due to decreased performance of some or all of the originally active LEDs 113-117). The set of sleepers 119 may include any particular number and/or arrangement of the LEDs as deemed appropriate for a particular lamp application.

Each string may be considered a solid state light emitting element or 'source' coupled to supply appropriate pumping energy to the light guide container 13 so as to pump or excite the semiconductor nanophosphor, where each such element or string comprises one or more light emitting diodes (LEDs) serving as individual solid state emitters. In the example of FIG. 9, each such element or string 113 to 119 comprises a plurality of the 405 nm LEDs.

The electrical components shown in FIG. 9 also include a LED control system 120. The control system 121 includes LED driver circuits for the various LEDs of the array 111 as well as a micro-control unit (MCU) 129. In the example, the MCU 129 controls the LED driver circuits via digital-to-analog (D/A) converters. The driver circuit 121 drives the LEDs 113 of the first channel Ch1, the driver circuit 123 drives the LEDs 115 of the second channel Ch2, and the driver circuit 125 drives the LEDs 117 of the third channel Ch3. In a similar fashion, when active, the driver circuit 127 provides electrical current to the other LEDs 119 of channel Ch4.

Although current modulation (e.g. pulse width modulation) or current amplitude control could be used, this example uses constant current to the LEDs. Hence, the intensity of the emitted light of a given LED in the array 111 is proportional to the level of current supplied by the respective driver circuit. The current output of each driver circuit is controlled by the higher level logic of the system, in this case, by the programmable MCU 129 via the respective A/D converter.

The driver circuits supply electrical current at the respective levels for the individual sets of 405 nm LEDs 113-119 to cause the LEDs to emit light. The MCU 129 controls the LED driver circuit 121 via a D/A converter 122, and the MCU 129 controls the LED driver circuit 123 via a D/A converter 124. Similarly, the MCU 129 controls the LED driver circuit 125 via a D/A converter 126. The amount of the emitted light of a given LED set is related to the level of current supplied by the respective driver circuit. In a similar fashion, the MCU 129 controls the LED driver circuit 127 via the D/A converter 128. When active, the driver circuit 127 provides electrical current to the sleeper LEDs 119. The LEDs in turn emit energy, in this example 405 nm light, to pump the nanophosphors in the material 15 to produce the white light output.

The LED driver circuits and the microcontroller 129 receive power from a power supply 131, which is connected to an appropriate power source (not separately shown). For most general lighting applications, the power source will be an AC line current source, however, some applications may utilize DC power from a battery or the like. The power supply 131 provides AC to DC conversion if necessary, and converts the voltage and current from the source to the levels needed by the LED driver circuits and the MCU 129.

A programmable microcontroller or microprocessor, such as the MCU 129, typically includes or has coupled thereto random-access memory (RAM) for storing data and read-only memory (ROM) and/or electrically erasable read only memory (EEROM) for storing control programming and any pre-defined operational parameters, such as pre-established light data for the current setting(s) for the strings of LEDs 113 to 119. The microcontroller 129 itself comprises registers and other components for implementing a central processing unit (CPU) and possibly an associated arithmetic logic unit. The CPU implements the program to process data in the desired manner and thereby generates desired control outputs. The microcontroller 129 is programmed to control the LED driver circuits 121 to 127 via the A/D converters 122 to 128 to set the individual output intensities of the 405 nm LEDs to desired levels, and in this circuit example to implement a step-wise system intensity control by selectively activating and deactivating strings of LEDs. For an ON-state of a string/channel, the program of the microcontroller 129 will set the level of the current to the desired level at or around the rated current, by providing an appropriate data input to the D/A converter for the respective channel.

The electrical system associated with the fixture also includes a digital data communication interface 139 that enables communications to and/or from a separate or remote transceiver (not shown in this drawing) which provides communications for an appropriate control element, e.g. for implementing a desired user interface. A number of fixtures of the type shown may connect over a common communication link, so that one control transceiver can provide instructions via interfaces 139 to the MCUs 129 in a number of such fixtures. The transceiver at the other end of the link (opposite the interface 139) provides communications to the fixture(s) in accord with the appropriate protocol. Different forms of communication may be used to offer different links to the user interface device. Some versions, for example, may implement an RF link to a personal digital assistant by which the user could select intensity or brightness settings. Various rotary switches and wired controls may be used, and other designs may implement various wired or wireless network communications. Any desired medium and/or communications protocol may be utilized, and the data communication interface 139 may receive digital intensity setting inputs and/or other control related information from any type of user interface or master control unit.

To insure that the desired performance is maintained, the MCU 129 in this implementation receives a feedback signal from one or more sensors 143. A variety of different sensors may be used, alone or in combination, for different applications. In the example, the sensors 143 include a light intensity sensor 145 and a temperature sensor 147. The MCU 129 may use the sensed temperature feedback in a variety of ways, e.g. to adjust operating parameters if an excessive temperature is detected.

The light sensor 145 provides intensity information to the MCU 129. A variety of different sensors are available, for use as the sensor 145. The sensor 143 may provide color related information, or the system could use an additional sensor for color related measurements. In a fixture in the system 50 of FIG. 7A, the light sensor 145 might be coupled to detect intensity and or color of the light output of the lamp 61, for example at a point on the reflective surface 55. Alternatively, one or more sensors 145 may be mounted alongside the LEDs 11 and coupled through a similar aperture 14 for directly receiving light produced by the nanophosphors within the container 13. The MCU 129 uses the light sensor feedback information to determine when to activate the sleeper LEDs 119. The intensity feedback information may also cause the MCU 129 to adjust the constant current levels applied to one or more of the strings 113 to 117 of 405 nm LEDs in the control channels Ch1 to Ch3, to provide some degree of compensation for declining performance before it becomes necessary to activate the sleepers of channel Ch4.

Alternatively, if the sensor 145 sensed ambient light outside the fixture, the control might activate or adjust the intensity of light output in response to the ambient light. For example, in a setting with considerable natural light access, the MCU programming might cause the MCU 129 to reduce or cut-off the light output of the fixture when daylight is bright, to reduce energy consumption on bright sunny days. However, the MCU programming would then provide somewhat higher intensity in the presence of some lower intensity natural light, e.g. in the early morning or in late afternoon or on cloudy days, and allow full intensity output from the fixture when there was no other substantial ambient light, e.g. at night.

Control of the near LED outputs could be controlled by selective modulation of the drive signals applied to the various LEDs. For example, the programming of the MCU 129 could cause the MCU to activate the A/D converters and thus the LED drivers to implement pulse width or pulse amplitude modulation to establish desired output levels for the LEDs of the respective control channels Ch1 to Ch3. Alternatively, the programming of the MCU 129 could cause the MCU to activate the A/D converters and thus the LED drivers to adjust otherwise constant current levels of the LEDs of the respective control channels Ch1 to Ch3. However, in the example, the MCU 129 simply controls the light output levels by activating the A/D converters to establish and maintain desired magnitudes for the current supplied by the respective driver circuit and thus the proportional intensity of the emitted light from each given string of LEDs. For an ON-state of a string/channel, the program of the MCU 129 will cause the MCU to set the level of the current to the desired level at or around the rated current, by providing an appropriate data input to the D/A converter for the particular channel. The LED light output is proportional to the current from the respective driver, as set through the D/A converter. The D/A converter will continue to output the particular analog level, to set the current and thus the LED output intensity in accord with the last command from the MCU 129, until the MCU 129 issues a new command to the particular D/A converter. While ON, the current will remain relatively constant. The LEDs of the string thus output near UV light of a corresponding relatively constant intensity. Since there is no modulation, it is expected that there will be little or no change for relatively long periods of ON-time, e.g. until the temperature or intensity feedback indicates a need for adjustment.

The current for the different channels Ch1 to Ch3 and/or the sleeper LEDs 119 may be different, e.g. if different numbers and/or types of LEDs are used, but where the LEDs in the array 111 are all of the same type, the current for the different channels Ch1 to Ch3 and/or the sleeper LEDs 119 in the ON state would all be approximately the same magnitude although the voltage drops may differ in view of the different numbers of LEDs in the strings of the different channels. For the OFF state of a particular string of LEDs 113 to 119, the MCU provides a 0 data input to the D/A converter for the respective string of LEDs.

Setting of the ON-OFF states of the LED strings 113-117 provides for selective control of the overall number of near UV LEDs of the array 111 that are ON in any given state. In the three main channel example (119 being for a sleeper channel), it is possible to control the states of the LED strings 113-117 to provide eight different brightness steps from 0 to 7, that is to say from all OFF (0 LEDs ON) to all 26 of the LEDs ON.

For the step-wise intensity control, the MCU 129 will control each driver via its associated A/D converter so as to supply constant current to the respective string of LEDs, at or around the rated current of the particular set of LEDs. Based on feedback, the MCU may adjust the level of the constant current somewhat, e.g. to compensate for some degree of degradation over time before it becomes necessary to activate the sleeper LEDs 119. In any case, the current level will remain within a range of the rated current for the particular string/channel of LEDs so that those LEDs produce the rated light out, for interaction with the semiconductor nanophosphor in the fixture optic, for example, to generate the white light of the high CRI and desired color temperature in a multi-phosphor white light implementation, as discussed above.

In the example, there are 8 possible system states or intensities, which range from 0 for full OFF up to 7 for maximum ON. To select among the states, the communication interface 139 would receive a data signal from an input device, e.g. a user interface or a higher level automatic control, and would supply at least 3-bits of intensity control data to the MCU 129.

In the 0 state, all of the control channels Ch1 to Ch3 are OFF, and thus there are no LEDs ON. Conversely, in the 7 state, all of the control channels Ch1 to Ch3 are ON, and thus all 18 of the near UV LEDs 113-117 are ON and producing 405 nm light for excitation of the semiconductor nanophosphor in the optic. The other states provide a series of steps between full OFF and full ON. For example, at the brightness level number 1, only the first control channel C1 is ON, and the other channels Ch2 and Ch3 are OFF. In that state, only the 4 LEDs of the first control channel Ch1 are ON. At the brightness level number 2, only the second control channel Ch2 is ON, and the other channels Ch1 and Ch3 are OFF. In that state, only the 6 LEDs of the second control channel Ch2 are ON. Similarly, at the brightness level number 3, only the third control channel Ch3 is ON, and the other channels Ch1 and Ch2 are OFF. In that state, only the 8 LEDs of the third control channel Ch3 are ON. In the next three states (brightness levels 4-6) different combinations of two channels are ON concurrently. For example, at the brightness level number 4, the first control channel Ch1 and the second control channel Ch2 are both ON, but the other channel Ch3 is OFF. In that state, the 10 LEDs of the channels Ch1 and Ch2 are ON. At the brightness level number 5, the first control channel Ch1 and the third control channel Ch3 are both ON, but the other channel Ch2 is OFF. In that state, the 12 LEDs of the channels Ch1 and Ch3 are ON. Similarly, at the brightness level number 6, the second control channel Ch2 and the third control channel Ch3 are both ON, but the other channel Ch1 is OFF. In that state, the 14 LEDs of the channels Ch2 and Ch3 are ON.

The system can step up or down through the levels, in response to appropriate control inputs, e.g. received from a user interface element. Assuming that all of the LEDs generate approximately the same near UV light output at the rated current setting, the system intensity will be proportional to the number of near UV LEDs ON at each level. Hence, in the example of FIG. 9, the possible brightness steps will correspond to the levels of intensity at which 0, 4, 6, 8, 10, 12, 14, and 18 of the near UV LEDs are ON, respectively. The doped semiconductor nanophosphors convert near UV light to the desired white light of the corresponding intensities.

In the example, assume that all of the LEDs in the array 111 are similar type devices, e.g. near UV LEDs each rated to produce 405 nm or the like in the near UV range. All will have the same current rating at which they are all expected to pump the semiconductor nanophosphor dispersed in the material at 15 to cause the lamp 61 to output white light of a high CRI and particular color temperature. Since there is no pulse modulation change, there is no potential to change a state which might otherwise cause perceptible flickering.

As noted earlier, the circuit of FIG. 9 also offers sleeper LEDs 119. With the channels Ch1 to Ch3 all ON, the system would operate at its rated output level, but typically that is around 90% of the maximum output possible for the array 111, as the sleepers 119 will be OFF. If the intensity achieved by activation of the channels Ch1 to Ch3 drops, for example as indicated by level of intensity detected by sensor 145, the MCU 129 can turn ON the string of sleepers 119, to return to the desired performance level. Sleepers 119 then could be always ON whenever the system is ON, and the MCU 129 would control intensity by ON-OFF control of the LEDs on channels Ch1 to Ch3.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A tubular lamp for producing visible light, comprising:
   a solid state source for producing electromagnetic energy, the solid state source comprising a semiconductor chip and an enclosure about the semiconductor chip;
   a tubular container positioned outside the enclosure, the tubular container formed of optically transmissive material having an interior volume, the tubular container having a first end section with an external surface coupled to receive electromagnetic energy from the solid state source, a second end section opposite the first end section, and an elongated tubular longitudinal section between the first and second end sections, wherein the elongated tubular longitudinal section is configured to act as a light guide with respect to the electromagnetic energy received from the solid state source;
   a reflector at the second end section of the tubular container, configured to longitudinally reflect electromagnetic energy from the solid state source back through the light guide of the elongated tubular longitudinal section;
   a reflector at the first end section of the tubular container, configured to longitudinally reflect at least some electromagnetic energy back through the light guide of the elongated tubular longitudinal section;
   a bearer material at least substantially filling an interior volume of the tubular container; and
   a plurality of doped semiconductor nanophosphors dispersed in the bearer material in the container, the tubular container and bearer material being configured to provide deployment of the doped semiconductor nanophosphors outside the enclosure of the solid state source and remotely from the semiconductor chip of the solid state source, each doped semiconductor nanophosphor being of a type excited in response to the electromagnetic energy received from the solid state source for re-emitting visible light,
   wherein the longitudinal section of the tubular container is also configured to allow lateral emission of light produced by excitation of the doped semiconductor nanophosphors when excited by the electromagnetic energy received from the solid state source, and
   wherein:
   (a) the visible light output produced by excitation of the doped semiconductor nanophosphors is at least substantially white;
   (b) the visible light output produced by excitation of the doped semiconductor nanophosphors has a color rendering index (CRI) of 75 or higher; and
   (c) the visible light output produced by excitation of the doped semiconductor nanophosphors has a color temperature in one of the following ranges:
   2,725±145° Kelvin;
   3,045±175° Kelvin;
   3,465±245° Kelvin; and
   3,985±275° Kelvin.

2. The tubular lamp of claim 1, each of the doped semiconductor nanophosphors in the plurality being of a type excited in response to the electromagnetic energy from the solid state source for re-emitting visible light of a different spectrum having substantially no overlap with absorption spectra of the doped semiconductor nanophosphors, the doped semiconductor nanophosphors together producing a visible light output for the tubular lamp through the longitudinal section when excited by the electromagnetic energy received from the solid state source.

3. The tubular lamp of claim 1, wherein the bearer material is selected from either a gas or a liquid and fills the interior volume of the tubular container in its gas or liquid state.

4. The tubular lamp of claim 1, wherein the bearer material with the one or more semiconductor nanophosphors dispersed therein appears at least substantially clear when the solid state source is off.

5. The tubular lamp of claim 1, wherein the bearer material with the one or more semiconductor nanophosphors dispersed therein appears at least substantially translucent when the solid state source is off.

6. The tubular lamp of claim 1, wherein the solid state source has an emission rating wavelength A in the range of around 460 nm and below ($\lambda \leq 460$ nm).

7. The tubular lamp of claim 1, wherein:
the solid state source comprises a plurality of light emitting diodes (LEDs), and
the tubular lamp further comprises an index matching gel between the LEDs and a surface of the tubular container for optically coupling electromagnetic energy from the LEDs into the container.

8. The tubular lamp of claim 1 in combination with circuitry for driving the solid state source, wherein:
the circuitry is configured for driving the solid state source in response to alternating current electricity, or
the circuitry is configured for converting alternating current electricity to direct current electricity and driving the solid state source with the direct current electricity.

9. The tubular lamp of claim 1, wherein the tubular container comprises:
an inner surface of the longitudinal section configured to provide total internal reflection with respect to electromagnetic energy from the solid state source and to allow the emission of light produced by excitation of the one or more doped semiconductor nanophosphors.

10. The tubular lamp of claim 1, wherein the tubular container comprises:
a partially transmissive partially reflective reflector on an inner surface of the longitudinal section configured to provide reflection with respect to electromagnetic energy from the solid state source and to allow the emission of light produced by excitation of the one or more doped semiconductor nanophosphors.

11. The tubular lamp of claim 1, wherein each doped semiconductor nanophosphor includes nanocrystals formed of semiconductor materials which are doped with an impurity.

12. The tubular lamp of claim 1, wherein the elongated tubular longitudinal section of the container is generally cylindrical.

13. The tubular lamp of claim 1, wherein the elongated tubular longitudinal section of the container has a lateral cross section that is at least substantially circular.

14. The tubular lamp of claim 2, wherein one or more of the doped semiconductor nanophosphors comprises zinc selenide quantum dots doped with manganese or copper.

15. The tubular lamp of claim 3, wherein the bearer material is the gas and the gas comprises one gas or a combination of gases each selected from the group consisting of: hydrogen gas, inert gases and hydrocarbon based gases.

16. The tubular lamp of claim 3, wherein each doped semiconductor nanophosphor includes nanocrystals formed of semiconductor materials which are doped with an impurity.

17. The tubular lamp of claim 5, wherein the solid state source is a near ultraviolet (UV) solid state source for producing near UV electromagnetic energy in a range of 380-420 nm.

18. The tubular lamp of claim 6, wherein the solid state source comprises a plurality of light emitting diodes (LEDs) each for emitting near UV electromagnetic energy in a range of 380-420 nm.

19. The tubular lamp of claim 17, wherein each LED has an emission rating wavelength A around 405 nm.

20. A tubular lamp for producing visible white light, comprising:
a solid state source for producing electromagnetic energy, the solid state source comprising a semiconductor chip and an enclosure about the semiconductor chip;
a tubular container positioned outside the enclosure, the tubular container formed of optically transmissive material having an interior volume, the tubular container having a first end section with an external surface coupled to receive electromagnetic energy from the solid state source, a second end section opposite the first end section, and an elongated tubular longitudinal section between the first and second end sections, wherein the elongated tubular longitudinal section is configured to act as a light guide with respect to the electromagnetic energy received from the solid state source;
a reflector at the second end section of the tubular container, configured to longitudinally reflect electromagnetic energy from the solid state source back through the light guide of the elongated tubular longitudinal section;
a reflector at the first end section of the tubular container, configured to longitudinally reflect at least some electromagnetic energy back through the light guide of the elongated tubular longitudinal section;
a bearer material at least substantially filling an interior volume of the tubular container; and
a plurality of doped semiconductor nanophosphors dispersed in the bearer material, each of the doped semiconductor nanophosphors being of a type excited in response to the electromagnetic energy from the solid state source for re-emitting visible light of a different spectrum, the doped semiconductor nanophosphors together producing a visible white light output for the tubular lamp through the longitudinal section of the tubular container when the doped semiconductor nanophosphors are excited by the electromagnetic energy received from the solid state source, wherein:
the tubular container and bearer material are configured to provide deployment of the doped semiconductor nanophosphors outside the enclosure of the solid state source and remotely from the semiconductor chip of the solid state source, and
the longitudinal section of the tubular container is also configured to allow lateral emission of light produced by excitation of the doped semiconductor nanophosphors when excited by the electromagnetic energy received from the solid state source.

21. The tubular lamp of claim 20, wherein the solid state source comprises a plurality of light emitting diodes (LEDs), the lamp further comprises:

a lamp base at one end of the tubular container;
a circuit board within the lamp base having a surface on which the LEDs are mounted; and
a heat dissipater within the lamp base for receiving and dissipating heat produced by the LEDs during operation.

22. The tubular lamp of claim 21, wherein the heat dissipater further comprises a membronic cooling element for circulating air through the vent and across the heat sink.

23. The tubular lamp of claim 21, wherein the heat dissipater further comprises an active cooling element.

24. The tubular lamp of claim 20, wherein each doped semiconductor nanophosphor includes nanocrystals formed of semiconductor materials which are doped with an impurity.

25. The tubular lamp of claim 21, wherein:
the heat dissipater comprises a heat sink coupled to receive the heat produced by the LEDs during operation; and
a housing of the lamp base comprises an air vent.

26. The tubular lamp of claim 16, wherein:
(a) the visible light output produced by excitation of the doped semiconductor nanophosphors is at least substantially white;
(b) the visible light output produced by excitation of the doped semiconductor nanophosphors has a color rendering index (CRI) of 75 or higher; and
(c) the visible light output produced by excitation of the doped semiconductor nanophosphors has a color temperature in one of the following ranges:
2,725±145° Kelvin;
3,045±175° Kelvin;
3,465±245° Kelvin; and
3,985±275° Kelvin.

27. The tubular lamp of claim 20, wherein the elongated tubular longitudinal section of the container is generally cylindrical and has a lateral cross section that is at least substantially circular.

* * * * *